US011252773B2

United States Patent
Cheong et al.

(10) Patent No.: US 11,252,773 B2
(45) Date of Patent: Feb. 15, 2022

(54) METHOD FOR SUPPORTING MULTIPLE LINKS IN BLUETOOTH NETWORK ENVIRONMENT AND ELECTRONIC DEVICE THEREOF

(71) Applicant: Samsung Electronics Co., Ltd., Suwon-si (KR)

(72) Inventors: Gupil Cheong, Suwon-si (KR); Byoungchul Lee, Suwon-si (KR); Jongmu Choi, Suwon-si (KR); Doosuk Kang, Suwon-si (KR); Bokun Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/971,638

(22) PCT Filed: Aug. 5, 2020

(86) PCT No.: PCT/KR2020/010311
§ 371 (c)(1),
(2) Date: Aug. 20, 2020

(87) PCT Pub. No.: WO2021/033962
PCT Pub. Date: Feb. 25, 2021

(65) Prior Publication Data
US 2021/0282207 A1   Sep. 9, 2021

(30) Foreign Application Priority Data

Aug. 16, 2019   (KR) .................. 10-2019-0100100

(51) Int. Cl.
*H04W 76/15*     (2018.01)
*H04W 4/80*      (2018.01)
(Continued)

(52) U.S. Cl.
CPC .......... *H04W 76/15* (2018.02); *H04L 5/0055* (2013.01); *H04W 4/80* (2018.02); *H04W 72/0446* (2013.01)

(58) Field of Classification Search
CPC ... H04W 76/15; H04W 4/80; H04W 72/0446; H04W 72/04; H04W 88/06; H04W 76/14;
(Continued)

(56) References Cited

U.S. PATENT DOCUMENTS 7,430,217 B2   9/2008  Kuhl et al.
7,860,459 B2   12/2010 Jeong
(Continued)

FOREIGN PATENT DOCUMENTS

KR   10-2017-0016883 A   2/2017

OTHER PUBLICATIONS

International Search Report of the International Searching Authority in connection with International Application No. PCT/KR2020-010311 dated Nov. 13, 2020, 6 pages.

*Primary Examiner* — Andrew Wendell

(57) ABSTRACT

An electronic device is disclosed which includes a wireless communication circuit configured to support BLUETOOTH communication, a processor, and a memory. The electronic device may connect with a first external electronic device via a first link configured to communicate in units of time slots, connect with a second external electronic device via the second link, transmit first link information for estimation of a radio resource of the first link to the second external electronic device via the second link, change a radio resource of the second link using the first link information, and communicate with the second external electronic device via the second link using the changed radio resource. In addition to the above, various embodiments disclosed in the present disclosure are possible.

20 Claims, 18 Drawing Sheets

(51) Int. Cl.
*H04L 5/00* (2006.01)
*H04W 72/04* (2009.01)

(58) Field of Classification Search
CPC .. H04W 72/0493; H04W 76/10; H04B 3/544; H04B 7/18558; H04L 5/0055; Y02D 30/70
See application file for complete search history.

(56) References Cited

U.S. PATENT DOCUMENTS

| | | | |
|---|---|---|---|
| 7,995,687 B2 | 8/2011 | Desai et al. | |
| 8,942,329 B2 | 1/2015 | Desai et al. | |
| 9,066,327 B2 | 6/2015 | Liu | |
| 10,136,429 B2 | 11/2018 | Lee et al. | |
| 10,212,569 B1 | 2/2019 | Huang et al. | |
| 10,448,232 B2 | 10/2019 | Sung et al. | |
| 2002/0142789 A1 | 10/2002 | Kuhl et al. | |
| 2007/0159349 A1 | 7/2007 | Chang et al. | |
| 2008/0063030 A1 | 3/2008 | Jeong | |
| 2008/0198837 A1* | 8/2008 | Moon | H04L 5/06 370/350 |
| 2008/0219323 A1 | 9/2008 | Desai et al. | |
| 2008/0258864 A1* | 10/2008 | Hattori | H04B 5/02 340/5.8 |
| 2014/0126553 A1* | 5/2014 | Li | H04L 5/0073 370/336 |
| 2014/0362795 A1* | 12/2014 | Choi | H04W 72/10 370/329 |
| 2014/0378056 A1 | 12/2014 | Liu | |
| 2016/0119739 A1* | 4/2016 | Hampel | H04W 4/38 370/315 |
| 2016/0183286 A1* | 6/2016 | Park | H04W 72/1257 370/329 |
| 2017/0251469 A1 | 8/2017 | Lee et al. | |
| 2018/0152979 A1* | 5/2018 | Lee | H04W 72/0406 |
| 2019/0075582 A1* | 3/2019 | Kim | H04L 1/0029 |
| 2019/0141502 A1 | 5/2019 | Sung et al. | |
| 2019/0230459 A1 | 7/2019 | Sridharan et al. | |
| 2019/0239054 A1 | 8/2019 | Sung et al. | |
| 2020/0137545 A1 | 4/2020 | Sung et al. | |
| 2020/0328776 A1* | 10/2020 | Scholand | H04B 1/715 |

* cited by examiner

METHOD FOR SUPPORTING MULTIPLE LINKS IN BLUETOOTH NETWORK ENVIRONMENT AND ELECTRONIC DEVICE THEREOF

CROSS-REFERENCE TO RELATED APPLICATIONS

This application is a 371 National Stage of International Application No. PCT/KR2020/010311, filed Aug. 5, 2020, which claims priority to Korean Patent Application No. 10-2019-0100100, filed Aug. 16, 2019, the disclosures of which are herein incorporated by reference in their entirety.

BACKGROUND

1. Field

Various embodiments disclosed in the present disclosure relate to a method for supporting multiple links in a BLUETOOTH network environment and an electronic device therefor.

2. Description of Related Art

The BLUETOOTH standard technology defined by the BLUETOOTH special interest group (BLUETOOTH SIG) defines a protocol for short-range wireless communication between electronic devices. In a BLUETOOTH network environment, electronic devices may transmit or receive data packets containing content, such as text, voice, images, or video, in a specified frequency band (e.g., about 2.4 gigahertz (GHz)).

For example, user equipment (UE), such as a smartphone, a tablet, a desktop computer, or a laptop computer, may transmit data packets to other user equipment or accessory devices. The accessory device may include, for example, at least one of an earphone, a headset, a speaker, a mouse, a keyboard, or a display device.

SUMMARY

A topology representing the BLUETOOTH network environment may include one user device (e.g., a device under test (DUT)) that transmits data packets and a plurality of devices that receive data packets from the user device. For example, when an earphone (or headset) is connected to a smartphone, the earphone worn on the left ear of a user and the earphone worn on the right ear of the user may receive data packets from the smartphone.

Each of a plurality of devices receiving data packets may form an individual link with the user device. In this case, since the user device has to generate a plurality of links in order to transmit data packets, resource consumption and power consumption of the user device may occur and complexity may increase. In addition, as the number of devices to which the user device has to transmit data packets increases, the power consumption of the user device and a delay time of the data packet may increase. When the electronic device operates a plurality of links based on one BLUETOOTH chip, the electronic device may fail to receive or transmit data due to collision between the plurality of links.

Various embodiments disclosed in the present disclosure may provide an electronic device and a method for solving the above-described problems in a BLUETOOTH network environment.

Various respective aspects and features of the disclosure are defined in the appended claims. Combinations of features from the dependent claims may be combined with features of the independent claims as appropriate and not merely as explicitly set out in the claims.

Furthermore, one or more selected features of any one embodiment described in this disclosure may be combined with one or more selected features of any other embodiment described herein, provided that the alternative combination of features at least partially alleviates the one or more technical problem discussed in this disclosure or at least partially alleviates a technical problem discernable by the skilled person from this disclosure and further provided that the particular combination or permutation of embodiment features thus formed would not be understood by the skilled person to be incompatible.

Two or more physically distinct components in any described example implementation of this disclosure may alternatively be integrated into a single component where possible, provided that the same function is performed by the single component thus formed. Conversely, a single component of any embodiment described in this disclosure may alternatively be implemented as two or more distinct components to achieve the same function, where appropriate.

According to an embodiment disclosed in the present disclosure, there is provided an electronic device including a wireless communication circuit configured to support BLUETOOTH communication, a processor operatively connected with the wireless communication circuit, and a memory operatively connected with the processor. The memory may store one or more instructions that, when executed, cause the processor to connect via a first link configured to communicate with a first external electronic device in units of time slots using the wireless communication circuit, connect with a second external electronic device via a second link using the wireless communication circuit, transmit first link information for estimation of a radio resource of the first link to the second external electronic device via the second link, receive first data from the first external electronic device via the first link in a first time slot of the first link, transmit a first response message to the first data to the first external electronic device via the first link in a second time slot of the first link subsequent to the first time slot, determine whether or not second data is received from the first external electronic device via the first link, within a first time interval set in a third time slot of the first link subsequent to the second time slot, and if the second data is not received within the first time interval, communicate with the second external electronic device via the second link in a second time interval subsequent to the first time interval and including a portion of the third time slot.

According to an embodiment disclosed in the present disclosure, there is provided an electronic device including a wireless communication circuit configured to support BLUETOOTH communication, a processor operatively connected with the wireless communication circuit, and a memory operatively connected with the processor. The memory may store one or more instructions that, when executed, cause the processor to connect with a first external electronic device via a first link using the wireless communication circuit, receive second link information for estimation of a radio resource of a second link between the first external electronic device and a second external electronic device, from the first electronic device via the first link, receive first data transmitted from the second external electronic device via the second link in a first time slot of the second link, using the second link information, determine whether or not second data is received from the second external electronic device via the second link, within a first time interval set in a third time slot of the second link, and if the second data is not received within the first time interval, communicate with the first external electronic device via the first link using a channel access code of the second link in a second time interval subsequent to the first time interval and including a portion of the third time slot. The third time slot may be a time slot set to the second external electronic device to transmit a signal to the first external electronic device.

According to an embodiment disclosed in the present disclosure, there is provided a communication method of an electronic device including connecting with a first external electronic device via a first link configured to communicate in units of time slots based on a BLUETOOTH communication standard, the communication method connecting with a second external electronic device via a second link based on the BLUETOOTH communication standard, transmitting first link information for estimation of a radio resource of the first link to the second external electronic device via the second link, receiving first data from the first external electronic device via the first link in a first time slot of the first link, transmitting a first response message to the first data to the first external electronic device via the first link, in a second time slot of the first link subsequent to the first time slot, determining whether or not second data is received from the first external electronic device via the first link, within a first time interval set in a third time slot of the first link subsequent to the second time slot, and if the second data is not received within the first time interval, communicating with the second external electronic device via the second link in a second time interval subsequent to the first time interval and including a portion of the third time slot.

It is an aim of certain embodiments of the disclosure to solve, mitigate or obviate, at least partly, at least one of the problems and/or disadvantages associated with the prior art. Certain embodiments aim to provide at least one of the advantages described below.

According to various embodiments disclosed in the present disclosure, the electronic device may reduce collision between multiple links in the BLUETOOTH network environment and increase the throughput of the BLUETOOTH network.

Besides, various effects may be provided that are directly or indirectly identified through the disclosure.

BRIEF DESCRIPTION OF THE DRAWINGS

With respect to the description of the drawings, the same or similar reference signs may be used for the same or similar elements.

DETAILED DESCRIPTION

Figure 1:
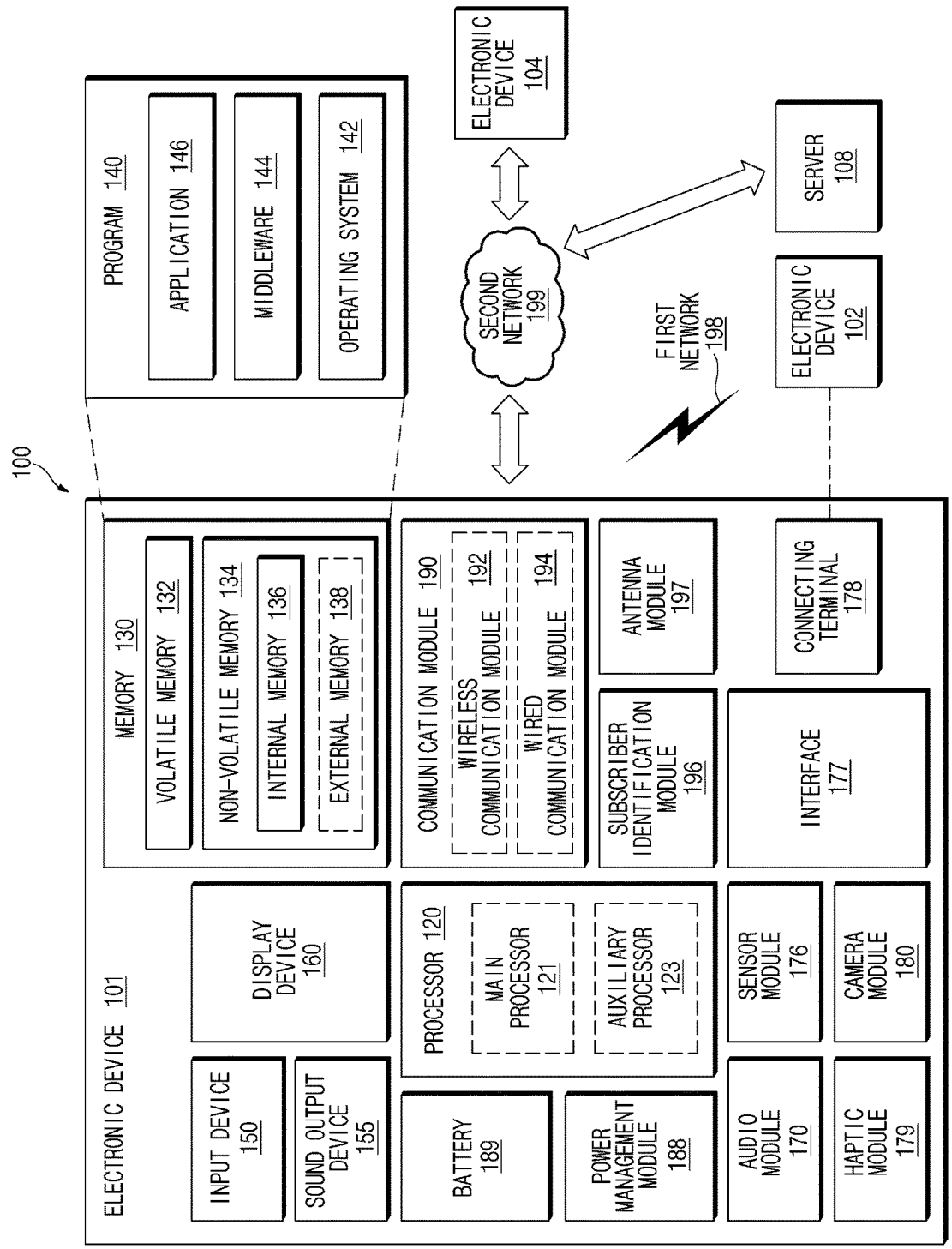
FIG. 1 is a block diagram illustrating an electronic device in a network environment according to various embodiments.

Hereinafter, various embodiments disclosed in the present disclosure will be described with reference to the accompanying drawings. However, this is not intended to limit the present disclosure to the specific embodiments, and it is to be construed to include various modifications, equivalents, and/or alternatives of embodiments of the present disclosure.

The scope of protection is defined by the appended independent claims. Further features are specified by the appended dependent claims. Example implementations can be realized comprising one or more features of any claim taken jointly and severally in any and all permutations.

The examples described in this disclosure include non-limiting example implementations of components corresponding to one or more features specified by the appended independent claims and these features (or their corresponding components) either individually or in combination may contribute to ameliorating one or more technical problems deducible by the skilled person from this disclosure.

Furthermore, one or more selected component of any one example described in this disclosure may be combined with one or more selected component of any other one or more example described in this disclosure, or alternatively may be combined with features of an appended independent claim to form a further alternative example.

Further example implementations can be realized comprising one or more components of any herein described implementation taken jointly and severally in any and all permutations. Yet further example implementations may also be realized by combining features of one or more of the appended claims with one or more selected components of any example implementation described herein.

In forming such further example implementations, some components of any example implementation described in this disclosure may be omitted. The one or more components that may be omitted are those components that the skilled person would directly and unambiguously recognize as being not, as such, indispensable for the function of the present technique in the light of a technical problem discernible from this disclosure. The skilled person would recognize that replacement or removal of such an omitted components does not require modification of other components or features of the further alternative example to compensate for the change. Thus further example implementations may be included, according to the present technique, even if the selected combination of features and/or components is not specifically recited in this disclosure.

Two or more physically distinct components in any described example implementation of this disclosure may alternatively be integrated into a single component where possible, provided that the same function is performed by the single component thus formed. Conversely, a single component of any example implementation described in this disclosure may alternatively be implemented as two or more distinct components to achieve the same function, where appropriate.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
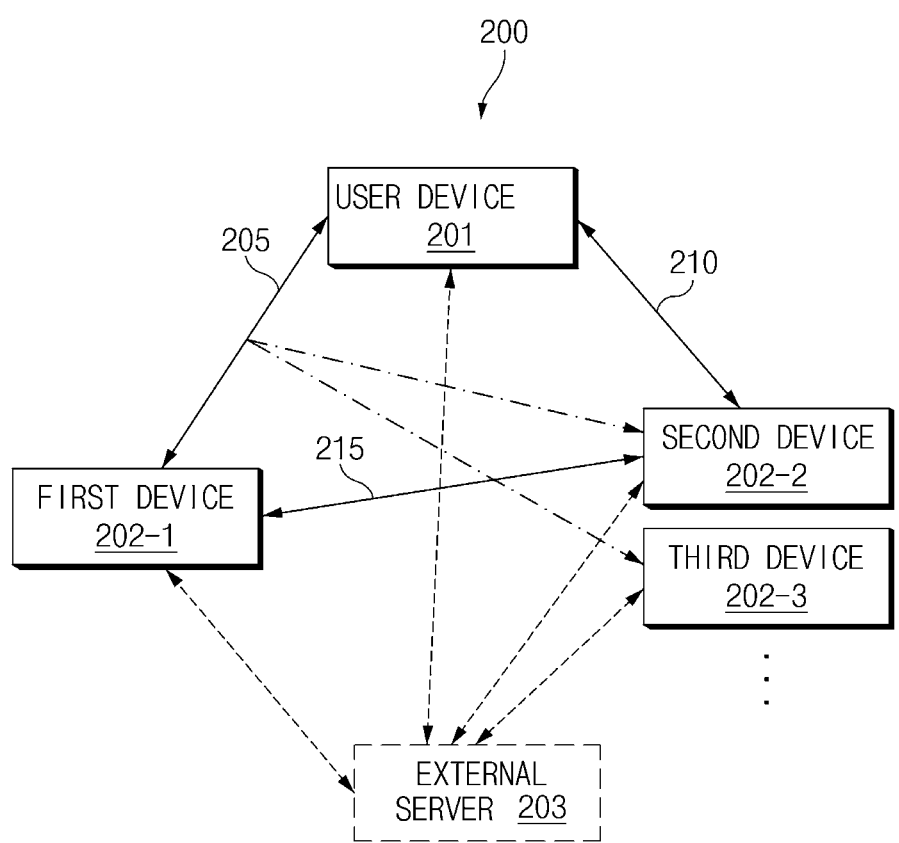
FIG. 2 is a diagram illustrating a topology in a BLUETOOTH network environment according to various embodiments.

FIG. 2 is a diagram illustrating a topology 200 in the BLUETOOTH network environment according to various embodiments.

Referring to FIG. 2, a user device 201 and devices 202-1, 202-2, and 202-3 included in the topology 200 may include the same or similar components as at least a part of the electronic device 101 illustrated in FIG. 1, and may perform, at least partially, the same or similar functions. For example, the user device 201 and the devices 202-1, 202-2, and 202-3 may perform wireless communication in a short distance according to a BLUETOOTH network defined by the BLUETOOTH SIG. The BLUETOOTH network may include, for example, a BLUETOOTH legacy network and a BLUETOOTH low energy (BLE) network. According to an embodiment, the user device 201 and the devices 202-1, 202-2, and 202-3 may perform wireless communication via one of the BLUETOOTH legacy network and the BLE network, or may perform wireless communication via the two networks.

Examples of the user device 201 may include a user terminal, such as a smartphone, a tablet, a desktop computer, or a laptop computer, and examples of the devices 202-1, 202-2, and 202-3 may include an accessory device, such as an earphone, a headset, a speaker, a mouse, a keyboard, or a display device. According to an embodiment, each of the devices 202-1, 202-2, and 202-3 may recognize a counterpart device (e.g., a first device 202-1, a second device 202-2, or a third device 202-3) in advance, or may store information (e.g., address information) of the counterpart device in advance. For example, if the first device 202-1 and the second device 202-2 are accessory devices (e.g., the earphones) forming one set, the first device 202-1 and the second device 202-2 may recognize each other in advance, or may store each other's address information in advance.

According to an embodiment, the user device 201 may serve as a master device, and the devices 202-1, 202-2, or 202-3 may serve as a slave device. The number of devices serving as the slave device is not limited to the example illustrated in FIG. 2. According to an embodiment, determination may be made as to which device serves as the master device or the slave device in a procedure in which a link (e.g., 205, 210, or 215) between devices is created. According to another embodiment, one of the first device 202-1 and the second device 202-2 (e.g., the first device 202-1) may serve as a master device, and the other device (e.g., the second device 202-2) may serve as a slave device.

The master device may control the physical channel. For example, the master device may transmit a data packet, whereas the slave device may transmit a data packet to the master device after receiving the data packet. For another example, a channel resource (e.g., frequency hopping channel) for transmission of a data packet may be generated based on a clock of the master device. In the BLUETOOTH legacy network, time resources (e.g., time slots) may be determined based on a clock of the master device. The time slot may be, for example, 625 µs (microseconds). In the BLE network, the master device and the slave device transmit data packets every specified interval, and if data packets are received, may respond after a specified time (e.g., the inter-frame space (T_IFS), about 150 µs).

According to an embodiment, the user device 201 may transmit a data packet including content such as text, voice, image, or video to the devices 202-1, 202-2, and 202-3. Depending on the type of content included in the data packet, at least one of the devices 202-1, 202-2, or 202-3 as well as the user device 201 may transmit a data packet. For example, if music is played on the user device 201, only the user device 201 may transmit a data packet, whereas if a call is performed on the user device 201, at least one of the devices 202-1, 202-2, or 202-3, in addition to the user device 201, may also transmit a data packet including content (e.g., voice data) to the user device 201. If only the user device 201 transmits a data packet, the user device 201 may be referred to as a source device, and the devices 202-1, 202-2, and 202-3 may be referred to as a sink device.

If the user device 201 creates or establishes a plurality of links with a plurality of devices 202-1, 202-2, and 202-3 in order to transmit a data packet, the resource consumption and power consumption of the user device 201 may increase, and thus the user device 201 may form only the first link 205 with the first device 202-1, and may transmit the data packet via the first link 205. In this case, at least one of other devices (e.g., 202-2, 202-3) may monitor the first link 205 in order to receive a data packet containing content. In this case, the user device 201 may be referred to as a device under test (DUT), the first device 202-1 may be referred to as a primary earbud or primary equipment (PE), and the at least one of other devices (e.g., 202-2, 202-3) may be referred to a secondary earbud, or secondary equipment (SE).

According to an embodiment, the first device 202-1 may create a third link 215 with the second device 202-2. The first device 202-1 may transmit information associated with the first link 205 to the second device 202-2 via the third link 215 such that the second device 202-2 may monitor the first link 205 and transmit a response message to the user device 201. Hereinafter, the term "monitoring" may mean a state of attempting to receive at least a portion of a packet transmitted via a corresponding link or a state capable of receiving at least a portion of a packet. For example, if the second device 202-2 monitors the first link 205, the second device 202-2 may receive or attempt to receive at least a portion of the packet transmitted by the user device 201 or the first device 202-1 (e.g., the electronic devices forming the first link 205) via the first link 205. In this case, the user device 201 may recognize the second device 202-2 using the second link 210, but may not recognize the presence of the second device 202-2 via the first link 205. The information associated with the first link 205 may include address information (e.g., the BLUETOOTH address of the master device of the first link 205, the BLUETOOTH address of the user device 201, and/or the BLUETOOTH address of the first device 202-1), piconet clock information (e.g. clock native (CLKN) of the master device of the first link 205), logical transport (LT) address information (e.g., information allocated by the master device of the first link 205), used channel map information, link key information, service discovery protocol (SDP) information (e.g., service and/or profile information associated with the first link 205), and/or supported feature information. The information associated with the first link 205 may further include, for example, an extended inquiry response (EIR) packet. The EIR packet may include resource control information of the first link 205 and/or information about the manufacturer. The second device 202-2 may determine a hopping channel (or frequency hopping channel) of the first link 205 through address information and clock information, and may decrypt the data packet encrypted through the link key information. The second device 202-2 may generate an access code (or channel access code) and address information (e.g., LT address information) corresponding to the first link 205 based on the information associated with the first link 205, and may transmit a response message including the generated access code and address information to the user device 201. In this case, the user device 201 may determine whether to retransmit the data packet based on the response message transmitted from the second device 202-2 even if a link with the second device 202-2 is not created.

According to another embodiment, if the first device 202-1 and the second device 202-2 are devices that support the same user account or a similar user account (e.g., a family account), the first device 202-1 and the second device 202-2 may share the information associated with the first link 205 through an external device (e.g., an external server 203) that are linked to the first device 202-1 or the second device 202-2 through the same or similar user account. In this case, the topology 200 may further include the external server 203. Similarly, the third device 202-3 may also be a device that supports the same user account or similar account (e.g., family account) as the first device 202-1. For example, the first device 202-1 may transmit the information associated with the first link 205 to the external server 203, and the external server 203 may transmit information associated with the first link 205 to the second device 202-2 and/or the third device 202-3. If a request is received, for example, from the second device 202-2 and/or the third device 202-3, the external server 203 may transmit information (e.g., the information associated with the first link 205) received from the first device 202-1 and/or the user device 201 to the second device 202-2 and/or the third device 202-3. If the request is received from the second device 202-2 and/or the third device 202-3, the external server 203 may request the first device 202-1 and/or the user device 201 to transmit the information associated with the first link 205, and may receive the information associated with the first link 205 from the first device 202-1 and/or the user device 201. If the request is received from the second device 202-2 and/or the third device 202-3 (202-2), the external server 203 may transmit the information associated with the first link 205, which is stored in the external server 203, to the second device 202-2 and/or the third device 202-3.

According to another embodiment, the second device 202-2 may share the information associated with the first link 205 from the user device 201. For example, the user device 201 may transmit the information associated with the first link 205 to the second device 202-2 via the second link 210. For example, after transmission of the information associated with the first link 205, the user device 201 may release the second link 210.

According to an embodiment, the first device 202-1 and/or the second device 202-2 may transmit the response message to the user device 201 in order to notify that the same data packet (e.g., first data packet) has been normally received. The response message may include a positive acknowledgement (ACK) message indicating that the data packet has been normally received or a negative acknowledgement (NACK) message indicating that the data packet has not been normally received. The response message may include, for example, one bit of information. For example, if an ACK message is received after transmitting a data packet, the user device 201 may transmit the next data packet, and if a NACK message is received or a response message is not received within a specified time, the user device 201 may retransmit the same data packet. For another example, if a NACK message for the data packet is received or a response message is not received within the specified time, the user device 201 may cause another device (e.g., the first device 202-1) that has transmitted the ACK message to transmit the NACK message, or may cause yet another device (e.g., the second device 202-2) that has not transmitted the response message within the specified time to retransmit the data packet.

According to an embodiment, the second device 202-2 may transmit a response message to the data packet received from the user device 201 via the first link 205 to the user device 201 via the first link 205. The user device 201 and/or the first device 202-1 may receive the response message from the second device 202-2 via the first link 205. In this case, the first device 202-1 and the second device 202-2 may transmit the response message using the same first link 205.

For example, the first device 202-1 and the second device 202-2 may be configured to transmit the NACK at a timing earlier than the ACK. For another example, the second device 202-2 and the first device 202-1 may transmit a response message by dividing time slots of the first link 205 so as not to be overlapped in time. For another example, the second device 202-2 may be configured to transmit a response message only if the reception of the data packet fails. In this case, the second device 202-2 may be configured to transmit a response message before the first device 202-1 when transmitting the NACK. If the NACK from the second device 202-2 is identified, the first device 202-1 may not transmit a response message. If a response message is not identified from the second device 202-2 within a specified time within the time slot, the first device 202-1 may transmit a response message to the user device 201 based on whether or not the first device 202-1 has received the data packet.

According to an embodiment, the second device 202-2 may transmit the response message to the data packet received from the user device 201 via the first link 205 to the user device 201 via the second link 210. For example, the user device 201 may be configured to transmit the next data packet if the response message of the first device 202-1 received via the first link 205 and the response message of the second device 202-2 received via the second link 210 are all ACKs. For another example, the user device 201 may be configured to determine whether to retransmit the data packet if the response message from the first device 202-1 or the response message from the second device 202-2 indicates NACKs. For another example, the user device 201 may be configured to retransmit the data packet if the response message from the first device 202-1 or the response message from the second device 202-2 indicates a NACK.

According to an embodiment, the second device 202-2 may transmit the response message to the data packet received from the user device 201 via the first link 205 to the first device 202-1 via the third link 215. For example, the first device 202-1 may be configured to transmit the response message via the first link 205 based on whether or not the response message of the second device 202-2 received from the second device 202-2 via the third link 215 and the data packet received from the user device 201 via the first link 205 have been successfully received. For example, if the response message of the second device 202-2 received from the second device 202-2 is a NACK or if reception of the data packet from the user device 201 via the first link 205 has failed, the first device 202-1 may transmit the response message indicating a NACK to the user device 201 via the first link 205. For another example, the first device 202-1 may be configured to determine whether to retransmit the data packet to the second device 202-2 if the first device 202-1 recognizes that the second device 202-2 has failed to receive the data packet from the user device 201 via the first link 205.

Figure 3A:
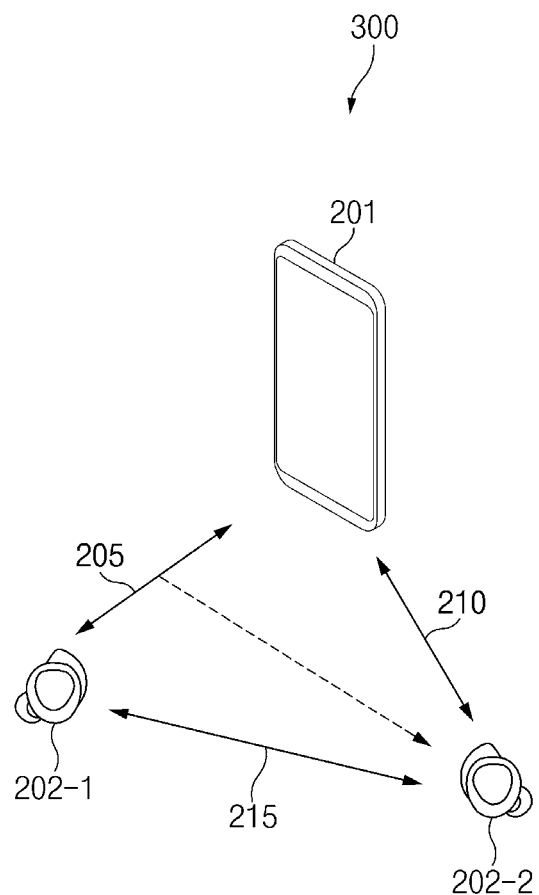
FIG. 3A is a diagram illustrating electronic devices of a BLUETOOTH network according to an embodiment.

FIG. 3A is a diagram illustrating electronic devices of a BLUETOOTH network 300 according to an embodiment.

Referring to FIG. 3A, for example, the user device 201 may be a portable electronic device (e.g., a smartphone). The first device 202-1 and the second device 202-2 may be wireless earphones or wireless earbuds forming one set. For example, the user device 201 may transmit audio data to the first device 202-1 via the first link 205. The first device 202-1 and the second device 202-2 may be configured to output the audio data received from the user device 201 via the first link 205. For another example, the first device 202-1 and/or the second device 202-2 may receive an audio signal from the user device 201, such as a voice call, and may transmit audio data corresponding to the received audio signal to the user device 201.

In the example of FIG. 3A, the first device 202-1 may perform operation of the first link 205 and the third link 215. In addition, the second device 202-2 may perform monitoring of the first link 205 and operation of the third link 215. According to an embodiment, data may be simultaneously transmitted and received via the first link 205 and the third link 215. For example, while the first device 202-1 and the second device 202-2 are exchanging data via the third link 215, the user device 201 may transmit data via the first link 205. In this case, the first device 202-1 may not receive data via the first link 205 due to communication via the third link 215. The second device 202-2 may not monitor the first link 205 due to communication via the third link 215. Since the first device 202-1 and the second device 202-2 have not received data transmitted via the first link 205, the first device 202-1 and the second device 202-2 may not transmit the response to the corresponding data to the user device 201. In response to not receiving the response, the user device 201 may retransmit the data via the first link 205.

Figure 3B:
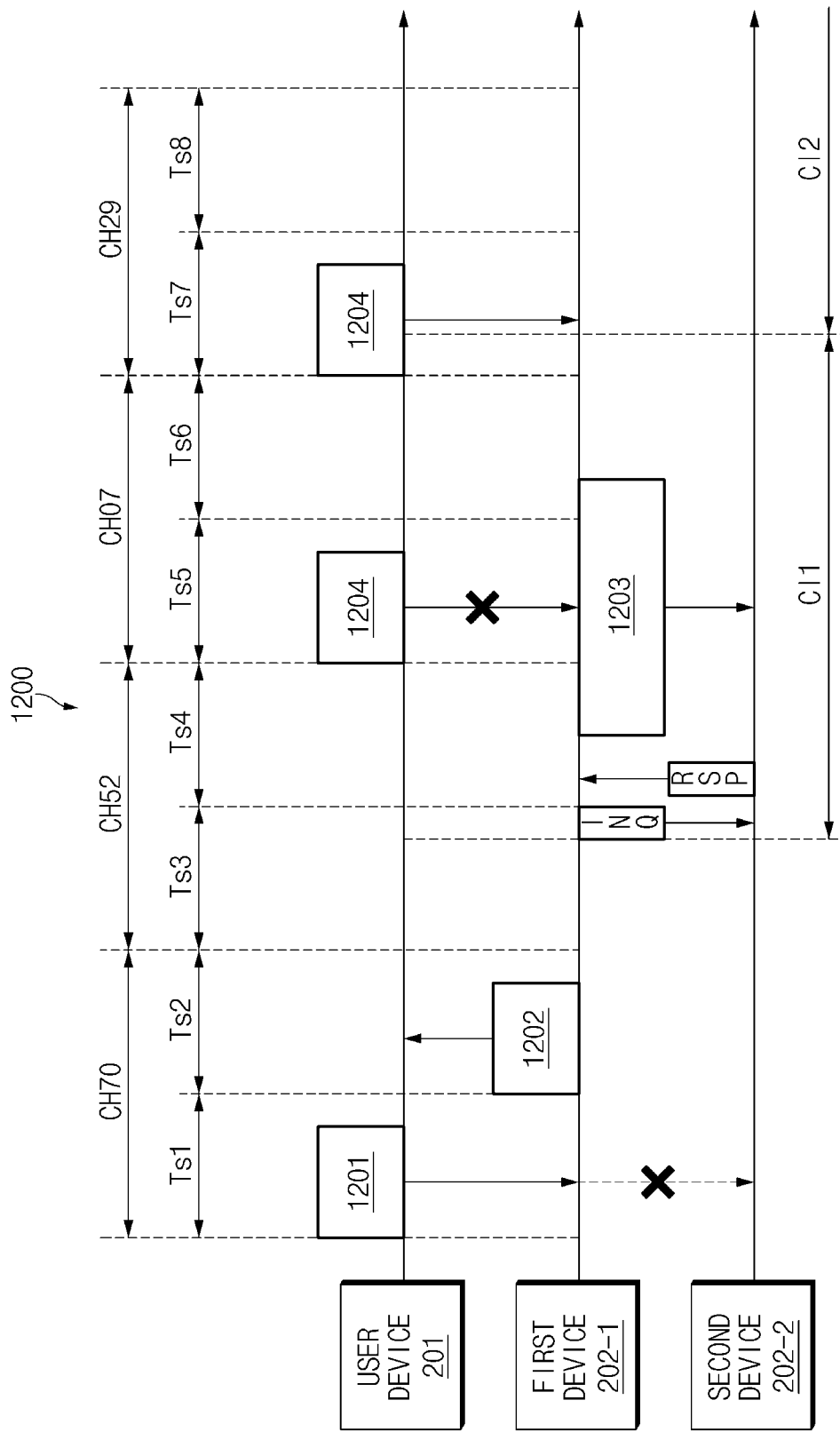
FIG. 3B is a diagram illustrating a situation in which data transmission between multiple links fails.

FIG. 3B is a diagram illustrating a situation in which data transmission between multiple links fails.

In FIG. 3B, the user device 201 may communicate with the first device 202-1 via the first link 205 based on the time slot. The first device 202-1 may communicate with the second device 202-2 via the third link 215 based on a connection interval.

For example, in a first time slot Ts1, the user device 201 may transmit first data 1201 via the first link 205. For example, the first device 202-1 may receive the first data 1201, but the second device 202-2 may fail to receive the first data 1201.

In a second time slot Ts2, the first device 202-1 may transmit second data 1202 to the user device 201 via the first link 205. For example, the second data 1202 may be a response message to the first data 1201.

For example, the first device 202-1 may transmit third data 1203 to the second device 202-2 via the third link 215 in a first connection interval CI1. According to an embodiment, if the first device 202-1 recognizes that the second device 202-2 has not received the first data 1201, the first device 202-1 may transmit the third data 1203 to the second device 202-2. For example, the first device 202-1 may transmit, to the second device 202-2 via the third link 215, an inquiry INQ inquiring whether the second device 202-2 has received data (e.g., the first data 1201) associated with the first link 205 in the first connection interval CI1. The second device 202-2 may transmit a response RSP indicating reception failure to the first device 202-1 via the third link 215. The first device 202-1 may recognize that the second device 202-2 has failed to receive the first data 1201 by receiving the response RSP. According to an embodiment, if the response RSP is not received from the second device 202-2 within a specified time, the first device 202-1 may recognize that the second device 202-2 has failed to receive the first data 1201.

In a fifth time slot Ts5, the user device 201 may transmit fourth data 1204 via the first link 205. For example, the bit rate for data modulation used in the third link 215 may be lower than the bit rate for data modulation used in the first link 205. In this case, the first device 202-1 may transmit, to the second device 202-2, the third data 1203 corresponding to the retransmission of the first data 1201 in a time interval longer than the first data 1201. Due to the transmission of the third data 1203, the first device 202-1 may not receive the fourth data 1204. Due to the reception of the third data 1203, the second device 202-2 may not receive the fourth data 1204. In a seventh time slot Ts7, the user device 201 may perform retransmission of the fourth data 1204. In this case, due to retransmission of the fourth data 1204, radio efficiency of the first link 205 may be reduced. In a second connection interval CI2, the first device 202-1 may not transmit data to the second device 202-2 due to the reception of the fourth data 1204. For example, the first device 202-1 and the second device 202-2 may identify whether or not the third link 215 is activated by transmitting and receiving a specified packet (e.g., an empty packet) at every connection interval. For another example, the first device 202-1 and the second device 202-2 may identify information associated with the reception of data received from the user device 201 at every connection interval. If the communication between the first device 202-1 and the second device 202-2 is restricted due to the reception of the fourth data 1204, data exchange between the first device 202-1 and the second device 202-2 may be omitted.

In this case, the throughput of the BLUETOOTH network may be reduced. In addition, the wireless communication (e.g., Wi-Fi communication using the same band as BLUETOOTH) of the user device 201 may be restricted due to repeated retransmissions. Furthermore, due to the first device 202-1 and the second device 202-2 not receiving data, sound interruption or sound quality degradation may occur.

Hereinafter, various embodiments for solving the above-described situations may be disclosed. For example, the first device 202-1 and the second device 202-2 may operate the third link 215 using link operating elements of the first link 205 (e.g., a channel access code, a logical transport address, used channel map, and/or clock). For example, the first device 202-1 and the second device 202-2 may communicate via the third link 215, using radio resources (e.g., time slots) of the first link 205 that are not used by the user device 201.

Figure 4:
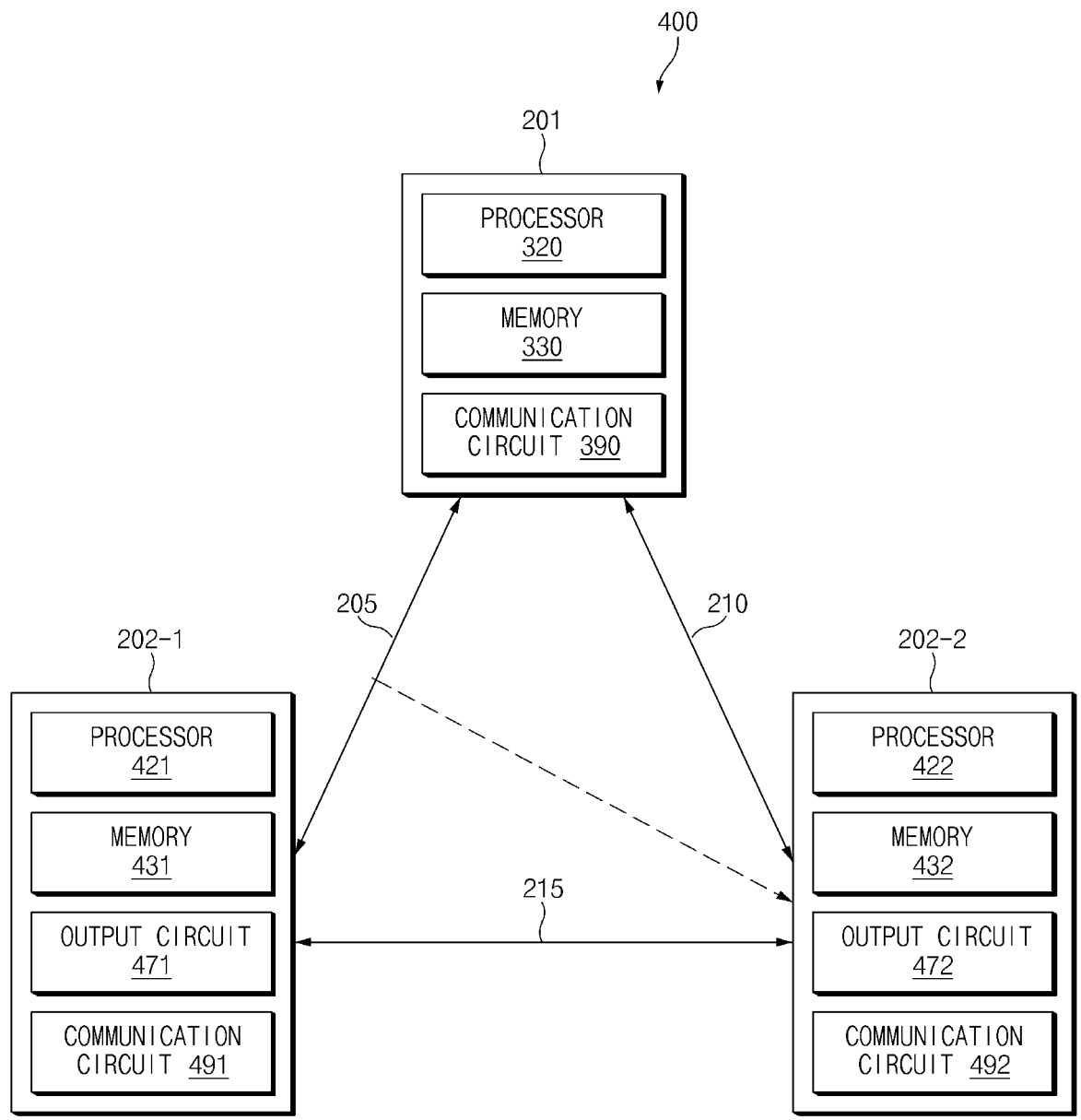
FIG. 4 is a block diagram of electronic devices according to an embodiment.

FIG. 4 is a block diagram of electronic devices according to an embodiment.

According to various embodiments, various electronic devices (e.g., the user device 201, the first device 202-1, and the second device 202-2) disclosed in the present disclosure may include at least some of the components of the electronic device (e.g., the electronic device 101 of FIG. 1) described above with reference to FIG. 1.

According to various embodiments, the user device 201 may include a processor 320 (e.g., the processor 120 of FIG. 1), a memory 330 (e.g., the memory 130 of FIG. 1), and a communication circuit 390 (e.g., the communication module 190 of FIG. 1). The processor 320 may be operatively connected to the communication circuit 390 and the memory 330. The memory 330 may store one or more instructions that, when executed, cause the processor 320 to perform various operations of the user device 201. The communication circuit 390 may be configured to support wireless communication based on a BLUETOOTH protocol (e.g., legacy BLUETOOTH and/or BLE). The user device 201 may further include a configuration not illustrated in FIG. 4. For example, the user device 201 may further include a display (e.g., the display device 160 of FIG. 1), an audio input/output device (e.g., the audio module 170 of FIG. 1), and/or a housing.

The user device 201 may be connected with the first device 202-1 via the first link 205. For example, the user device 201 and the first device 202-1 may communicate using a time slot set based on the clock of the master device of the first link 205 as a unit. For example, one time slot may be set such that the master device transmits data to the slave device or set such that the slave device transmits data to the master device. For example, one time slot may have a length of 625 μs (microseconds).

The user device 201 may transmit a data packet via the first link 205. For example, the user device 201 may transmit media data via the first link 205 based on an advanced audio distribution profile (A2DP). For another example, the user device 201 may transmit audio data in a synchronous connection oriented (SCO) or an extended SCO (eSCO) method.

The user device 201 may receive a response message to the data transmitted via the first link 205. For example, the user device 201 may receive a response message transmitted from the first device 202-1 via the first link 205. The user device 201 may receive a response message transmitted from the second device 202-2 via the first link 205. For example, the user device 201 may receive a response message transmitted by the second device 202-2 using the information of the first device 202-1 via the first link 205. According to an embodiment, if the response message indicates a negative acknowledgement (NACK) or if the response message is not received within a specified time after the transmission of data, the user device 201 may retransmit data via the first link 205. The value of an automatic repeat request number (ARQN) field of the header of the packet indicating a negative acknowledgement may be set to 0. For example, the user device 201 may retransmit data in a retransmission window of the first link 205. The user device 201 may attempt to retransmit the data until an ACK for the data is received within the retransmission window. If the ACK for the data is not received within the retransmission window, the user device 201 may transmit subsequent data, for example. If the response message indicates the acknowledgement (ACK), the user device 201 may transmit subsequent data via the first link 205. The value of the ARQN field of the header of the packet indicating acknowledgement may be set to 1. If the reception of the response message fails within the specified time, the user device 201 may retransmit the data via the first link 205.

According to an embodiment, the user device 201 may be connected with the second device 202-2 via the second link 210. For example, the user device 201 may establish the second link 210 after the connection with the first device 202-1. The user device 201 may transmit, to the second device 202-2, the information associated with the first link 205 via the second link 210, as is described above with reference to FIG. 2 and FIG. 3A. According to an embodiment, the second link 210 may be omitted. In this case, the second device 202-2 may receive information associated with the first link 205 from the first device 202-1 or from an external server (e.g., the external server 203 in FIG. 2).

According to various embodiments, the first device 202-1 may include a processor 421 (e.g., the processor 120 of FIG. 1), a memory 431 (e.g., the memory 130 of FIG. 1), an output circuit 471 (e.g., the audio module 170 of FIG. 1), and a communication circuit 491 (e.g., the communication module 190 of FIG. 1). The processor 421 may be operatively connected to the communication circuit 491, the output circuit 471, and the memory 431. The output circuit 471 may be set to output sound. The memory 431 may store one or more instructions that, when executed, cause the processor 421 to perform various operations of the first device 202-1. The first device 202-1 may further include a configuration not illustrated in FIG. 4. For example, the first device 202-1 may further include an indicator (e.g., the display device 160 of FIG. 1), an audio input device (e.g., the audio module 170), an input interface (e.g., the interface 177 of FIG. 1), and/or a housing. For another example, the first device 202-1 may further include a sensor (e.g., a proximity sensor and/or a pulse sensor) configured to detect whether or not the first device 202-1 is worn.

The first device 202-1 may be connected with the user device 201 via the first link 205. For example, the user device 201 and the first device 202-1 may communicate using a time slot set based on the clock of the master device of the first link 205 as a unit. For example, one time slot may be set such that the master device transmits data to the slave device or set such that the slave device transmits data to the master device. For example, one time slot may have a length of 625 μs (microseconds).

The first device 202-1 may receive a data packet from the user device 201 via the first link 205. The first device 202-1 may transmit a response message to the received data packet to the user device 201 via the first link 205. For example, the first device 202-1 may transmit a response message indicating an ACK if data is successfully received, and a response message indicating a NACK if data fails to be received. For another example, the first device 202-1 may be configured to transmit a response message indicating a NACK regardless of whether data is received in order to cause retransmission of the user device 201. For another example, the first device 202-1 may be configured to transmit a response message indicating a NACK only if data fails to be received, and not to transmit a response message if data is successfully received.

The first device 202-1 may be connected with the second device 202-2 via the third link 215. For example, the first device 202-1 may establish the third link 215 with the second device 202-2. According to various embodiments, the first device 202-1 may operate in conjunction with the first link 205 and the third link 215. The first device 202-1 may align the timing of the third link 215 (e.g., transmit/receive timing and/or time slot) with the timing of the first link 205 (e.g., the timing of the third link 215 is set according to an offset (e.g., 10 μs or more) specified from the timing of the first link 205). The first device 202-1 may align the channel of the third link 215 with the channel of the first link 205 (e.g., the channel of the third link 215 is set to be the same as the channel of the first link 205). For example, the first device 202-1 may perform channel hopping of the third link 215 according to channel hopping of the first link 205. The first device 202-1 may communicate with the second device 202-2 via the third link 215 using a channel access code (CAC) and/or a logical transport address (LT_ADDR) of the first link 205.

According to an embodiment, the first device 202-1 may operate the third link 215 according to the operating elements of the first link 205. The first device 202-1 may transmit first link information associated with the first link 205 via the third link 215 to the second device 202-2. For example, the first link information may include information for estimating a radio resource (e.g., time, timing, time resources, encryption, and/or frequency resources) of the first link 205. For example, the first link information may include information on an operating element (a channel access code (CAC), a logical transport address (LT_ADDR), used channel map, and/or clock) of the first link 205. The first link information may include address information (e.g., the BLUETOOTH address of the master device of the first link 205, the BLUETOOTH address of the user device 201, and/or the BLUETOOTH address of the first device 202-1), piconet clock information (e.g. clock native (CLKN) of the master device of the first link 205), logical transport (LT) address information (e.g., information allocated by the master device of the first link 205), used channel map information, link key information, service discovery protocol (SDP) information (e.g., service and/or profile information associated with the first link 205), and/or supported feature information.

For example, the CAC of the first link 205 may be generated based on the low address part (LAP) of the BLUETOOTH address of the master device of the first link 205. The CAC may be an access code used for communication between two electronic devices (e.g., the user device 201 and the first device 202-1) of a corresponding link (e.g., the first link 205) after the connection of an associated link is completed. The first device 202-1 may transmit, to the second device 202-2, the generated CAC and/or the BLUETOOTH address of the master device of the first link 205, as at least part of the first link information.

For example, the LT_ADDR may be an address assigned by the master device of the first link 205. The first device 202-1 may transmit, to the second device 202-2, the LT_ADDR as at least part of the first link information.

For example, the used channel map may be channel hopping information set by the master device of the first link 205. The first device 202-1 may transmit, to the second device 202-2, a used channel map as at least part of the first link information.

Examples of the clock information may include clock information of the master device and/or the slave device of the first link 205. The first device 202-1 may transmit, to the second device 202-2, the clock information as at least part of the first link information.

According to an embodiment, the first device 202-1 may communicate with the second device 202-2 using a time resource of the third link 215 corresponding to the traffic-free time slot of the first link 205. For example, the first device 202-1 may align the time slot of the third link 215 with the time slot of the first link 205 to have a specified offset (e.g., 10 µs or more), and may communicate with the second device 202-2 via the third link 215 using the aligned time slot. For example, the first device 202-1 may align the clock associated with the third link 215 with the clock of the first link 205 using a clock adjustment message.

According to an embodiment, the first device 202-1 may determine whether or not data is received within a specified time of a receiving slot (e.g., a time slot set for the user device 201 to transmit to the first device 202-1) of the first link 205. For example, the specified time may be a time margin of the receiving slot of the first device 202-1 (e.g., ±10 µs from the start time of the time slot). The first device 202-1 may identify whether or not data is received from the user device 201 within the time margin of the receiving slot. If data is received within the specified time in the receiving slot, the first device 202-1 may communicate with the user device 201 in the corresponding receiving slot. If data is not received within the specified time in the receiving slot, the first device 202-1 may communicate with the second device 202-2 via the third link 215 in the remaining time intervals of the corresponding receiving slot. For example, the first time slot may be a time slot set to allow the user device 201 to transmit a signal to the first device 202-1 via the first link 205, and the second time slot subsequent to the first time slot may be a time slot set to allow the first device 202-1 to transmit a signal to the user device 201 via the first link 205. In this case, if data is not received at the specified time in the first time slot, the first device 202-1 may communicate with the second device 202-2 using the remaining time except the specified time of the first time slot and the second time slot.

The first device 202-1 may change the CAC used for the third link 215 to the CAC of the first link 205. For example, if the CAC of the third link 215 is 0xBBBBBBBB and the CAC of the first link 205 is 0xAAAAAAAA, the first device 202-1 may change the CAC used for communication of the third link 215 (e.g., the CAC of the packet used for communication of the third link 215) to 0xAAAAAAAA. The first device 202-1 may change the LT_ADDR used for the third link 215 to a specified value (e.g., 0). For example, if the LT_ADDR of the first link 205 is 3 and the LT_ADDR of the third link 215 is 4, the first device 202-1 may change the LT_ADDR of the third link 215 to a specified value (e.g., 0), in order to prevent data from being duplicated by the user device 201. For example, the LT_ADDR of a specified value may be a value indicating broadcasting. The first device 202-1 may change the CAC and the LT_ADDR used for the third link 215. For example, if the CAC of the first link 205 is 0xAAAAAAAA and the LT_ADDR is 3, the first device 202-1 may set the CAC of the third link 215 to 0xAAAAAAAA, and may set the LT_ADDR to the specified value. Changing of the LT_ADDR is exemplary, and embodiments of the present disclosure are not limited thereto. For example, if the LT_ADDR used for the third link 215 is an LT_ADDR without a history of connecting to the user device 201, the first device 202-1 may maintain the LT_ADDR value of the third link 215.

According to an embodiment, the first device 202-1 may align the channel hopping of the third link 215 according to the channel hopping of the first link 205. For example, the first device 202-1 may estimate channel hopping of the first link 205 using the used channel map of the first link 205, and may perform the channel hopping for the third link 215 according to the estimated channel hopping.

According to an embodiment, the first device 202-1 may communicate with the second device 202-2 via the third link 215 using up to one time slot as a unit. For example, at least two time slots may be required to transmit and receive signals between the first device 202-1 and the user device 201. For example, if the user device 201 transmits data using a first slot, the first device 202-1 may transmit an ACK/NACK for data in a second slot subsequent to the first slot. Accordingly, the first device 202-1 may be to identify whether or not data is received from the user device 202-1 at least every two time slots. For example, if the first device 202-1 transmits data to the second device 202-2 via the third link 215 using two consecutive time slots, the first device 202-1 may monitor whether or not data is received from the user device 201 in the subsequent time slot of the first link 205. In this case, due to monitoring of the first link 205, the first device 202-1 may not receive a response signal to data transmitted from the second device 202-2 via the third link 215. In this way, in communication via the third link 215, the maximum number of consecutive time slots to be used for transmission or reception may be limited to one time slot.

A first-second time slot of the third link 215 may be aligned with the first time slot of the first link 205 at a specified offset. A second-second time slot of the third link 215 may be aligned with the second time slot of the first link 205 at a specified offset. In this case, the last part of the second-second time slot and the front part of the third time slot subsequent to the second time slot may overlap by the specified time on the time axis. Data transmitted in the overlapping time of the second-second time slot may overlap with data from the user device 201 transmitted in the third time slot. Therefore, the last part of the second-second time slot (e.g., an interval corresponding to the offset length) may not be used for communication via the third link 215. If data is not received from the user device 201 within a specified time in a reception time slot of the first link 205, the first device 202-1 may communicate with the second device 202-2 using the corresponding time slot of the third link 215 and the time slot subsequent thereto. In this case, the length of the subsequent time slot of the third link 215 may be reduced by a specified length (e.g., offset).

According to various embodiments, the second device 202-2 may include a processor 422 (e.g., the processor 120 of FIG. 1), a memory 432 (e.g., the memory 130 of FIG. 1), an output circuit 472 (e.g., the audio module 170 of FIG. 1), and a communication circuit 492 (e.g., the communication module 190 of FIG. 1). The processor 422 may be operatively connected to the communication circuit 492, the output circuit 472, and the memory 432. The output circuit 472 may be set to output sound. The memory 432 may store one or more instructions that, when executed, cause the processor 422 to perform various operations of the second device 202-2. The second device 202-2 may further include a configuration not illustrated in FIG. 4. For example, the second device 202-2 may further include an indicator (e.g., the display device 160 of FIG. 1), an audio input device (e.g., the audio module 170), an input interface (e.g., the interface 177 of FIG. 1), and/or a housing. For another example, the second device 202-2 may further include a sensor (e.g., a proximity sensor and/or a pulse sensor) configured to detect whether or not the second device 202-2 is worn.

The second device 202-2 may be connected with the first device 202-1 via the third link 215. The second device 202-2 may establish the third link 215 with the first device 202-1. For example, the first device 202-1 may be connected to the second device 202-2 via the third link 215 before the connection with the user device 201, upon connection with the user device 201, or after the connection with the user device 201.

According to an embodiment, the second device 202-2 may receive first link information associated with the first link 205 via the third link 215. For example, the first link information may include information for estimating a radio resource (e.g., time, timing, time resources, encryption, and/or frequency resources) of the first link 205. For example, the first link information may include information on an operating element (channel access code (CAC), a logical transport address (LT_ADDR), used channel map, and/or clock) of the first link 205. The first link information may include address information (e.g., the BLUETOOTH address of the master device of the first link 205, the BLUETOOTH address of the user device 201, and/or the BLUETOOTH address of the first device 202-1), piconet clock information (e.g. clock native (CLKN) of the master device of the first link 205), logical transport (LT) address information (e.g., information allocated by the master device of the first link 205), used channel map information, link key information, service discovery protocol (SDP) information (e.g., service and/or profile information associated with the first link 205), and/or supported feature information.

According to an embodiment, the second device 202-2 may monitor the first link 205 using information associated with the first link 205. The second device 202-2 may be configured to receive a data packet transmitted by the user device 201 via the first link 205 by monitoring the first link 205. The second device 202-2 receives a response message (e.g., ACK/NACK) to data received from the user device 201 by monitoring the first link 205 to the user device 201 via the first link 205. For example, the second device 202-2 may transmit an ACK if data is successfully received via the first link 205, and a NACK if data is not successfully received. For another example, the second device 202-2 may be configured to transmit a response message (e.g., NACK) only if the reception of data via the first link 205 fails. In this case, the second device 202-2 may be configured not to transmit a response message if data is successfully received via the first link 205. For another example, the second device 202-2 may be configured not to transmit a response message. In the above-described examples, if the second device 202-2 transmits a NACK, the second device 202-2 may be configured to transmit a response message before the first device 202-1. For example, the first device 202-1 and the second device 202-2 may receive data via the first link 205 in the first time slot, and may transmit a response message to the data in the second time subsequent to the first time slot. If the second device 202-2 fails to receive the data and the first device 202-1 successfully receives the data, the second device 202-2 may transmit a response message (e.g., NACK) via the first link 205 before a response message (e.g., ACK) of the first device 202-1.

According to an embodiment, if the second device 202-2 fails to receive a data packet via the first link 205, the second device 202-2 may request the first device 202-1 to retransmit the data packet via the third link 215. The second device 202-2 may receive the data packet retransmitted from the first device 202-1 via the third link 215.

According to various embodiments, the second device 202-2 may operate in conjunction with the first link 205 and the third link 215. The second device 202-2 may align the timing of the third link 215 (e.g., transmit/receive timing and/or time slot) with the timing of the first link 205. The second device 202-2 may align the channel of the third link 215 with the channel of the first link 205. For example, the second device 202-2 may perform channel hopping of the third link 215 according to channel hopping of the first link 205. The second device 202-2 may communicate with the first device 202-1 via the third link 215 using a channel access code (CAC) and/or a logical transport address (LT_ADDR) of the first link 205.

According to an embodiment, the second device 202-2 may operate the third link 215 according to the operating elements of the first link 205. The second device 202-2 may receive first link information associated with the first link 205 via the third link 215. For example, the first link information may include information for estimating a radio resource (e.g., time, timing, time resources, encryption, and/or frequency resources) of the first link 205. For example, the first link information may include information on an operating element (e.g., a channel access code (CAC), a logical transport address (LT_ADDR), used channel map, and/or clock) of the first link 205. The first link information may include address information (e.g., the BLUETOOTH address of the master device of the first link 205, the BLUETOOTH address of the user device 201, and/or the BLUETOOTH address of the first device 202-1), piconet clock information (e.g. clock native (CLKN) of the master device of the first link 205), logical transport (LT) address information (e.g., information allocated by the master device of the first link 205), used channel map information, link key information, service discovery protocol (SDP) information (e.g., service and/or profile information associated with the first link 205), and/or supported feature information.

According to an embodiment, the second device 202-2 may operate the third link 215 according to the operating elements and additional information of the first link 205. The second device 202-2 may receive the first link information associated with the first link 205 and additional information associated with the operational limit of the third link 215 from the first device 202-1 via the third link 215. For example, the additional information may include information regarding a specified offset for aligning the time resource of the third link 215 with the time slot of the first link 205 and/or information about the maximum number of consecutive slots allowed for the third link 215.

According to an embodiment, the second device 202-2 may calculate the CAC of the first link 205 using the address of the master device (e.g., the user device 201) of the first link 205. For example, the second device 202-2 may communicate with the first device 202-1 via the third link 215 using the CAC of the first link 205.

According to an embodiment, the second device 202-2 may communicate with the first device 202-1 using a time resource of the third link 215 corresponding to the traffic-free time slot of the first link 205. For example, the second device 202-2 may align the time slot of the third link 215 with the time slot of the first link 205 to have a specified offset (e.g., 10 μs or more), and may communicate with the first device 202-1 via the third link 215 using the aligned time slot. For example, the second device 202-2 may use a clock adjustment message to align the clock associated with the third link 215 with the clock of the first link 205. The second device 202-2 may align the clock of the third link 215 using the clock adjustment message received from the first device 202-1. For example, the second device 202-2 may operate the third link 215 such that the third link 215 is aligned with the first link 205 on the time axis according to the specified offset, using the specified offset of the clock information and the additional information of the first link information.

According to an embodiment, the second device 202-2 may determine whether or not data is received within a specified time of a receiving slot (e.g., a time slot set for the user device 201 to transmit to the first device 202-1) of the first link 205. For example, the specified time may be a time margin of the receiving slot of the second device 202-2 (e.g., ±10 μs from the start time of the slot). The second device 202-2 may identify whether or not data is transmitted from the user device 201 within the time margin of the receiving slot. If data is received within a specified time in the receiving slot, the second device 202-2 may receive data from the user device 201 via the first link 205 in the corresponding slot. If data is not received within the specified time in the receiving slot, the second device 202-2 may communicate with the first device 202-1 via the third link 215 in the remaining time intervals of the corresponding slot. For example, the first time slot may be a time slot set to allow the user device 201 to transmit a signal to the first device 202-1 via the first link 205, and the second time slot subsequent to the first time slot may be a time slot set to allow the first device 202-1 to transmit a signal to the user device 201 via the first link 205. In this case, if data is not received at the specified time in the first time slot, the second device 202-2 may use the remaining time except the specified time of the first time slot and the second time slot to communicate with the first device 202-1.

The second device 202-2 may change the CAC used for the third link 215 to the CAC of the first link 205. For example, if the CAC of the third link 215 is 0xBBBBBBBB and the CAC of the first link 205 is 0xAAAAAAAA, the second device 202-2 may change the CAC used for communication of the third link 215 (e.g., the CAC of the packet used for communication of the third link 215) to 0xAAAAAAAA. The second device 202-2 may change the LT_ADDR used for the third link 215 to a specified value (e.g., 0). For example, if the LT_ADDR of the first link 205 is 3 and the LT_ADDR of the third link 215 is 4, the second device 202-2 may change the LT_ADDR of the third link 215 to a specified value (e.g., 0), in order to prevent data from being duplicated by the user device 201. For example, the LT_ADDR of a specified value may be a value indicating broadcasting. The second device 202-2 may change the CAC and the LT_ADDR used for the third link 215. For example, if the CAC of the first link 205 is 0xAAAAAAAA and the LT_ADDR is 3, the second device 202-2 may set the CAC of the third link 215 to 0xAAAAAAAA, and may set the LT_ADDR to the specified value.

According to an embodiment, the second device 202-2 may align the channel hopping of the third link 215 according to the channel hopping of the first link 205. For example, the second device 202-2 may estimate channel hopping of the first link 205 using the used channel map of the first link 205, and may perform the channel hopping for the third link 215 according to the estimated channel hopping.

According to an embodiment, the second device 202-2 may communicate with the first device 202-1 via the third link 215 using up to one time slot as a unit. In communication via the third link 215, the maximum number of consecutive time slots to be used for transmission or reception may be limited to one time slot. For example, the maximum number of consecutive time slots may be indicated by additional information received from the first device 202-1.

A first-second time slot of the third link 215 may be aligned with the first time slot of the first link 205 at a specified offset. A second-second time slot of the third link 215 may be aligned with the second time slot of the first link 205 at a specified offset. In this case, the last part of the second-second time slot and the front part of the third time slot subsequent to the second time slot may overlap by the specified time on the time axis. Data transmitted in the overlapping time of the second-second time slot may overlap with data from the user device 201 transmitted in the third time slot. Therefore, the last part of the second-second time slot (e.g., an interval corresponding to the offset length) may not be used for communication via the third link 215. If no data is received from the user device 201 within a specified time in the reception time slot of the first link 205, the second device 202-2 may communicate with the first device 202-1 using the corresponding time slot of the third link 215 and the time slot subsequent thereto. In this case, the length of the subsequent time slot of the third link 215 may be reduced by a specified length (e.g., offset).

The various embodiments described above with reference to FIG. 4 are merely exemplary and may be referred to by various examples to be described below with reference to FIG. 5 to FIG. 17. In addition, the various embodiments described above may be combined with each other as long as they are not inconsistent with each other.

Figure 5:
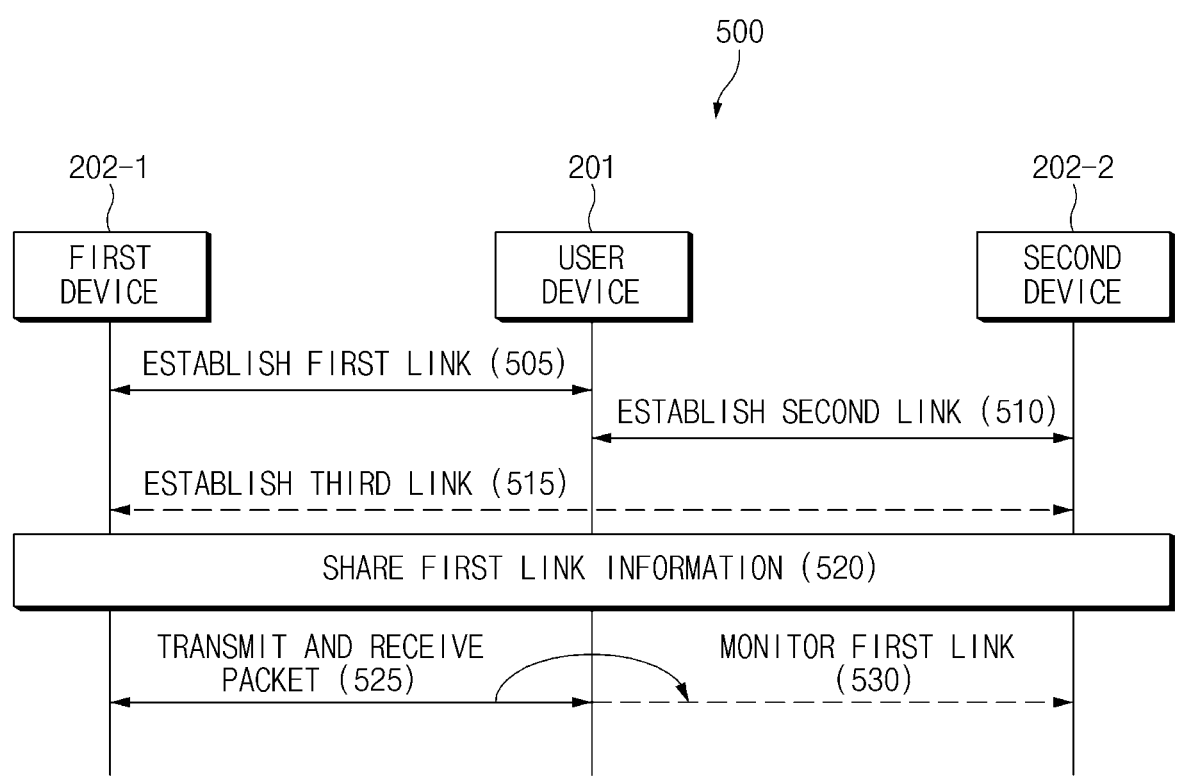
FIG. 5 is a signal flow diagram for communication between electronic devices according to various embodiments.

FIG. 5 is a signal flow diagram 500 for communication between electronic devices according to various embodiments.

Referring to FIG. 5, in operation 505, the user device 201 may establish a first link (e.g., the first link 205 of FIG. 2) with the first device 202-1. According to an embodiment, the user device 201 may be connected with the first device 202-1 via the first link 205. For example, the first link 205 may be one that is already established.

In operation 510, the user device 201 may establish a second link (e.g., the second link 210 of FIG. 2) with the second device 202-2. According to an embodiment, the user device 201 may be connected with the second device 202-2 via the second link 210. For example, the second link 210 may be one that is already established. The establishment of the second link 210 is exemplary, and embodiments of the present disclosure are not limited thereto. For example, the user device 201 and the second device 202-2 may establish the second link 210 before the establishment of the first link 205 (e.g., operation 505). For example, the second link 210 may be released after sharing the first link information (e.g., operation 520). For another example, the establishment of the second link 210 (e.g., operation 510) may be omitted.

Figure 6:
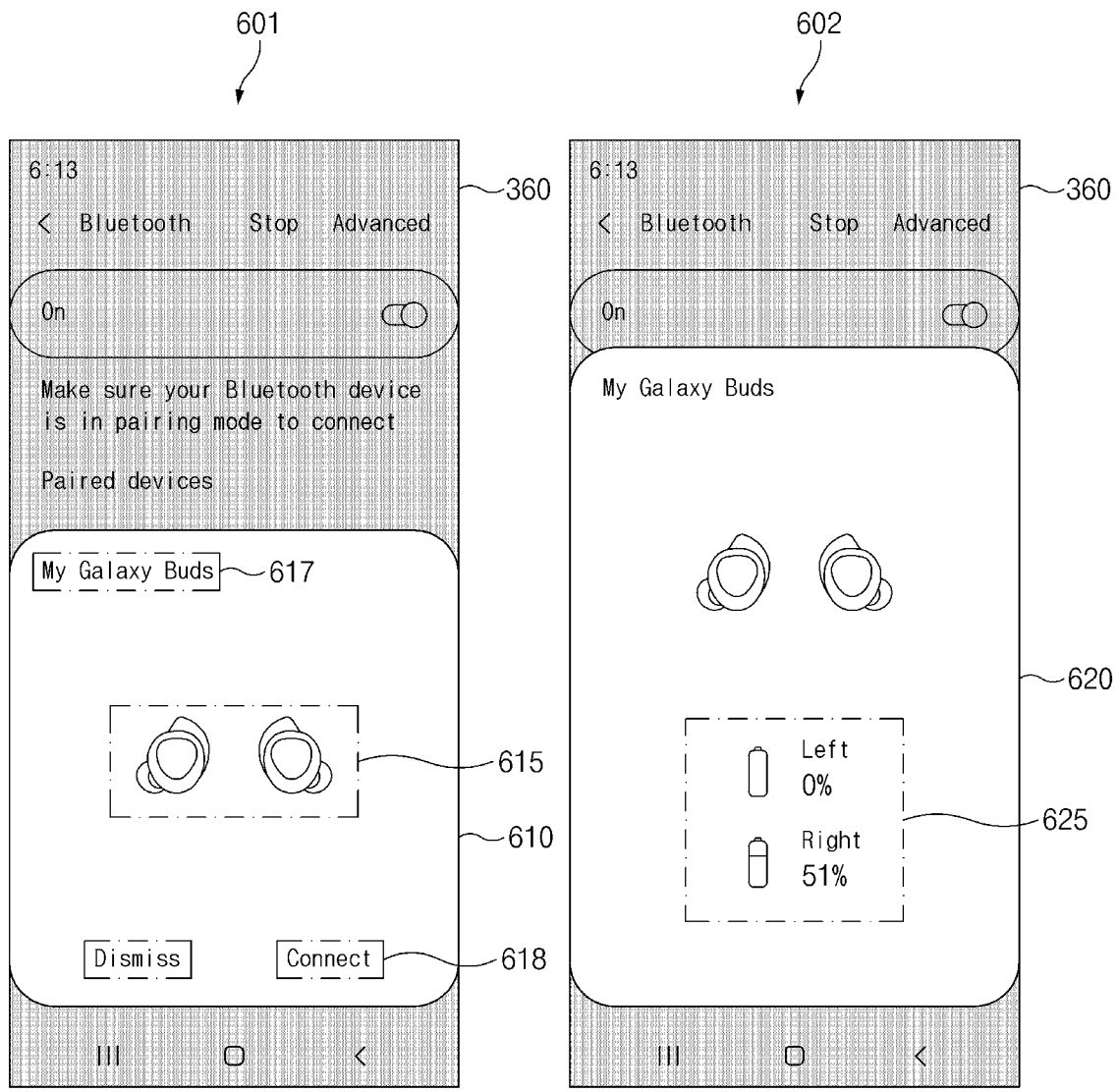
FIG. 6 is a diagram illustrating user interfaces (UI) showing connections of devices in the BLUETOOTH network environment according to an embodiment.

For example, operation 505 may be performed based on input to the user device 201. FIG. 6 is a diagram illustrating user interfaces (UI) showing connections of devices in the BLUETOOTH network environment according to various embodiments. FIG. 6 illustrates an embodiment in which the first device 202-1 and the second device 202-2 are configured as a set, but the same principle may be applied to the user interface showing only that the user device 201 is connected with the first device 202-1.

Referring to FIG. 6, at reference numeral 601, the user device 201 may recognize the first device 202-1 by receiving an advertising signal transmitted from the first device 202-1, and may output, through a display 360 of the user device 201, a first user interface 610 for informing a user of the recognized first device 202-1 and the second device 202-2 that forms a set with the first device 202-1.

The first user interface 610 is, for example, at least one of an image 615 representing shapes of the first device 202-1 and the second device 202-2 or a text 617 indicating the device names (e.g., My Galaxy Buds) of the first device 202-1 and the second device 202-2. For another example, although not illustrated in FIG. 6, the first user interface 610 may indicate whether or not the first device 202-1 or the second device 202-2 has a history of being previously connected.

According to an embodiment, the advertising signal may include information for connection (or pairing) of the user device 201 and the first device 202-1. For example, the advertising signal may include at least one of identification information of the first device 202-1, user account information, current pairing information indicating whether or not the first device 202-1 is being paired with another device, a paring list indicating a list of devices with which the first device 202-1 has been previously paired, simultaneous pairing information indicating devices capable of pairing with the first device 202-1 simultaneously, transmission power, sensing area, or battery status information. For another example, if the first device 202-1 forms a set with the second device 202-2, the advertising signal may further include at least one of identification information of the second device 202-2, user account information, current pairing information indicating whether or not the second device 202-2 is being paired with another device, a paring list indicating a list of devices with which the second device 202-2 has been previously paired, simultaneous pairing information indicating devices capable of pairing with the first device 202-1 simultaneously, transmission power, sensing area, or battery status information.

According to an embodiment, the first device 202-1 may transmit the advertising signal through a multicast method or a broadcast method.

According to an embodiment, the first device 202-1 may transmit the advertising signal according to a specified condition. For example, the first device 202-1 may transmit the advertising signal in response to detecting that the case in which the first device 202-1 is stored is opened. For another example, the first device 202-1 may transmit the advertising signal in response to receiving power or receiving user input. For another example, the first device 202-1 may transmit the advertising signal every specified period.

According to an embodiment, the user device 201 may establish (e.g., operation 505 of FIG. 5) the first link (e.g., the first link 205 of FIG. 2) with the first device 202-1, in response to receiving the user input 618 requesting connection with the first device 202-1 or automatically without the user input. According to an embodiment, the user device 201 and the first device 202-1 may establish the first link 205 according to a procedure based on the BLUETOOTH standard. For example, the user device 201 and the first device 202-1 may perform a baseband page procedure for recognizing the counterpart device, a link manager protocol (LMP) procedure for identifying the LMP version, a clock offset, and supported functions (e.g., supported features), a host request/response procedure for verifying connection, an authentication procedure for confirming whether or not the counterpart device is trustable, an encryption procedure, and a setup complete procedure for notifying a host of completion of the connection (e.g., the first link 205).

Once the first link 205 is established, as in reference numeral 602, the user device 201 may output, through the display 360, a second user interface 620 indicating that the first device 202-1 is connected to the user device 201. The second user interface 620 may further include, for example, an image 625 showing the battery status of the first device 202-1 and the second device 202-2 forming the set with the first device 202-1.

Although not illustrated in FIG. 6, according to an embodiment, if the first device 202-1 is discovered while the user device 201 is already connected to an external device other than the first device 202-1 and the second device 202-2, the user device 201 may transmit, to the first device 202-1 or the second device 202-2, information regarding a link that is already connected such that the first device 202-1 or the second device 202-2 is enabled to monitor the link that is already connected between the user device 201 and the external device. In this case, a first user interface 610 may include information indicating that the first device 202-1 or the second device 202-2 may be added. If a user input requesting that the first device 202-1 or the second device 202-2 is to be added is received, the user device 201 may transmit, to the first device 202-1 or the second device 202-2, the information regarding the link that is already connected.

Referring back to FIG. 5, in operation 515, the first device 202-1 and the second device 202-2 may establish the third link (e.g., the third link 215 of FIG. 2). The establishment of the third link 215 is exemplary, and embodiments of the present disclosure are not limited thereto. For example, the first device 202-1 and the second device 202-2 may establish the third link 215 before the establishment of the first link 205 (e.g., operation 505). For another example, the first device 202-1 and the second device 202-2 may establish the third link 215 before the establishment of the second link 210 (e.g., operation 510). For another example, the first device 202-1 and the second device 202-2 may establish the third link 215 substantially simultaneously with the establishment of the first link 205 or the establishment of the second link 210.

In operation 520, information associated with the first link 205 may be shared with the second device 202-2. According to an embodiment, the user device 201 or the first device 202-1 may share the information associated with the first link 205 with the second device 202-2. For example, the first device 202-1 may transmit, to the second device 202-2, information associated with the first link 205 via the third link 215. For another example, the user device 201 may transmit the information associated with the first link 205 to the second device 202-2 via the second link 210. For another example, the user device 201 or the first device 202-1 may transmit the information associated with the first link 205 to the second device 202-2 via an external server (e.g., the external server 203 of FIG. 2) or via an external electronic device (e.g., charging cases of the first device 202-1 and the second device 202-2). According to an embodiment, the user device 201 or the first device 202-1 may determine whether or not the information associated with the first link 205 is to be shared. For example, if determination is made that the information associated with the first link 205 is to be shared, the user device 201 or the first device 202-1 may transmit the information associated with the first link 205 to the second device 202-2. The information associated with the first link 205 may include, for example, at least one of address information, clock information, channel information, SDP result information, information on supported functions, key information, or EIR packets.

In operation 525 and operation 530, the user device 201 may transmit a data packet (e.g., the first data packet) including contents to the first device 202-1 via the first link 205. The second device 202-2 may monitor the first link 205 based on at least part (e.g., address information or clock information) of the information associated with the first link 205. The second device 202-2 may receive the same data packet as the data packet (e.g., the first data packet or the second data packet) received by the first device 202-1 through monitoring. Operation 530 may be referred to as shadowing, listening, or snooping.

According to various embodiments, each of the first link 205, the second link 210, and the third link 215 may be a link based on a BLUETOOTH legacy protocol or a BLE protocol.

Hereinafter, with reference to FIG. 7, FIG. 8, and FIG. 9, a connection and communication method based on the BLUETOOTH legacy protocol will be described. Hereinafter, a connection and communication method based on the BLUETOOTH legacy protocol will be described based on the first link 205, but the following descriptions may be similarly applied to the second link 210 and/or the third link 215.

Figure 7:
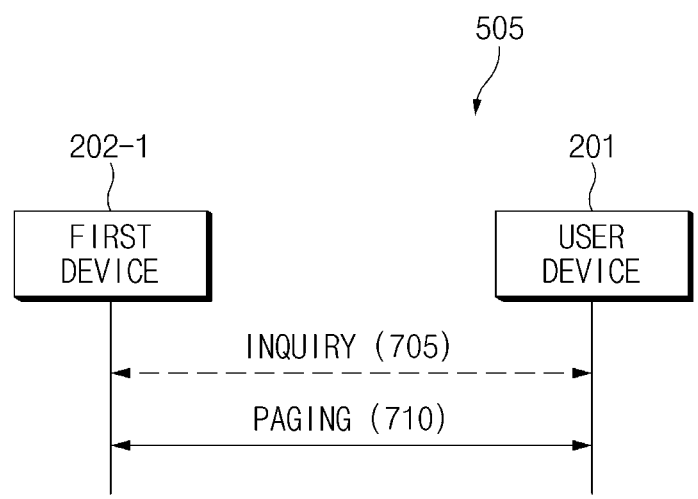
FIG. 7 is a signal flow diagram for connection of a first link according to an embodiment.

FIG. 7 is a signal flow diagram for connection of the first link 205 according to an embodiment. For example, operation 705 and/or operation 710 of FIG. 7 may be included in an operation (e.g., operation 505) of establishing the first link 205 in FIG. 5.

In operation 705, the first device 202-1 and the user device 201 may perform an inquiry. Through the inquiry, the first device 202-1 or the user device 201 may recognize a surrounding external electronic device. For example, a user of the user device 201 may operate the user device 201 in a search mode for a BLUETOOTH communication connection. The user may enable the user device 201 to perform an inquiry procedure by turning on the BLUETOOTH of the user device 201 and entering the user device 201 into the pairing mode. According to an embodiment, if the user device 201 already has the information of the first device 202-1, the inquiry (e.g., operation 705) may be omitted.

Figure 8:
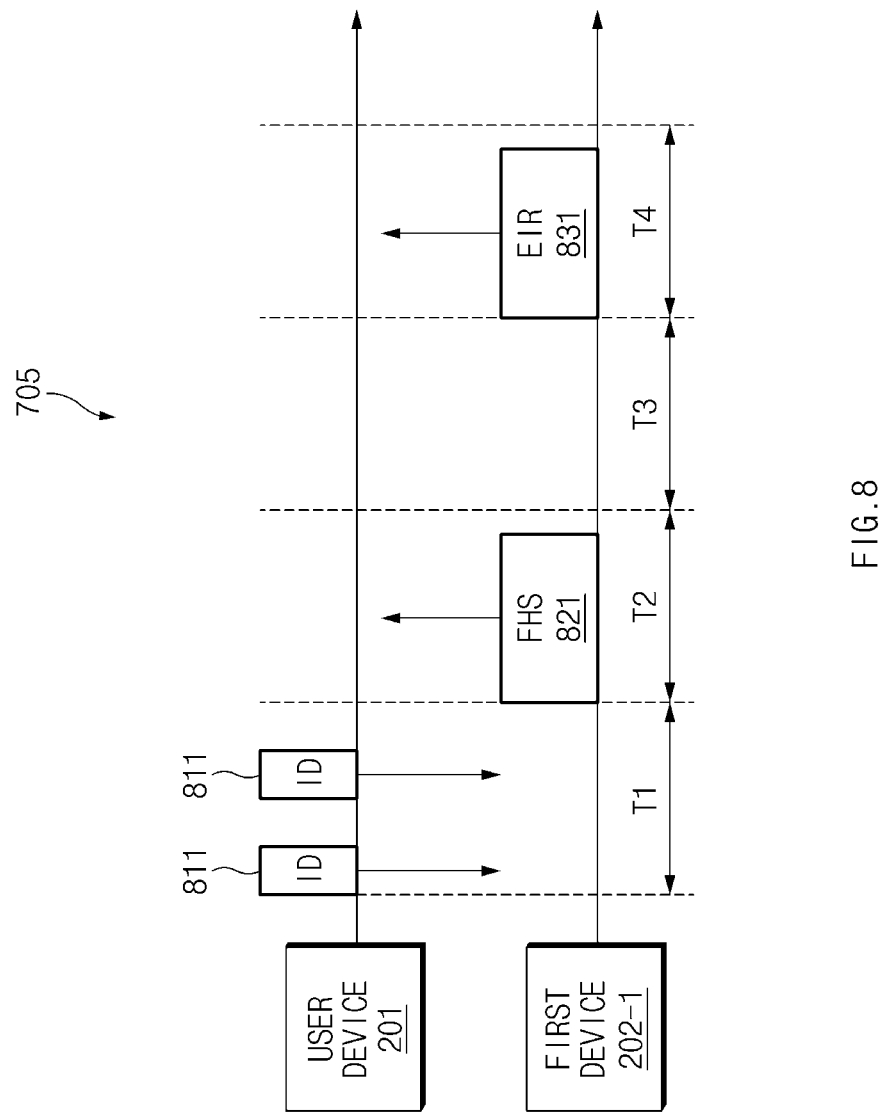
FIG. 8 is a diagram illustrating a packet exchange for performing an inquiry according to an embodiment.

FIG. 8 is a diagram illustrating a packet exchange for performing an inquiry according to an embodiment. In the example of FIG. 8, the user device 201 may be a device that performs an inquiry, and the first device 202-1 may be a device that performs an inquiry scan. However, embodiments of the present disclosure are not limited thereto. For example, the first device 202-1 may perform the inquiry and the user device 201 may perform the inquiry scan.

Referring to FIG. 8, the user device 201 and the first device 202-1 may communicate based on a time interval (e.g., a time slot). For example, each time interval may correspond to a time slot (e.g., 625 µs) of a specified length.

In the first time interval T1, the user device 201 may periodically transmit an identity (ID) packet 811. For example, the user device 201 may generate the ID packet 811 based on a general inquiry access code (GIAC). For example, the first time interval T1 may be a time interval in which the user device 201 is set to transmit a signal to the first device 202-1. The ID packet 811 may include, for example, a device access code (DAC) or an inquiry access code (IAC) of the user device 201. According to an embodiment, the ID packet 811 may be transmitted during a specified interval (e.g., 68 µs). According to an embodiment, in order to establish a link with the user device 201, the first device 202-1 may activate a communication circuit (e.g., at least a portion of the communication circuit 491 of FIG. 4), and may receive the ID packet 811 by listening in the first time interval T1.

In the second time interval T2, the first device 202-1 may transmit a frequency hop synchronization (FHS) packet 821 to the user device 201. For example, the first device 202-1 may transmit the FHS packet 821 in response to receiving the ID packet 811. The FHS packet 821 may include control information (e.g., clock information or address information) for establishing the first link 205. For example, the FHS packet 821 may include the BLUETOOTH address of the first device 202-1 that performs the inquiry scan. The FHS packet 821 may include information indicating a type of the first device 202-1 (e.g., class of device), extended inquiry response (EIR) bits indicating a subsequent packet, and/or clock information.

In the example of FIG. 8, the user device 201 and the first device 202-1 may be configured to alternately transmit signals every time interval. For example, the first time interval T1 and the third time interval T3 may be a time interval set to allow the user device 201 to transmit a signal to the first device 202-1. For example, the second time interval T2 and the fourth time interval T4 may be time intervals set to allow the first device 202-1 to transmit a signal to the user device 201. In the fourth time interval T4, the first device 202-1 may transmit the EIR packet 831 to the user device 201. The EIR packet 831 may include, for example, a device name of the first device 202-1, a transmission power level, a service class universally unique identifiers (UUIDs), and/or manufacturer's data.

Referring back to FIG. 7, in operation 710, the first device 202-1 and the user device 201 may perform paging. The first device 202-1 and the user device 201 may be connected through paging. As described above, if the first device 202-1 and the user device 201 know each other's addresses, the first device 202-1 and the user device 201 may omit the inquiry (operation 705) and perform paging.

Figure 9:
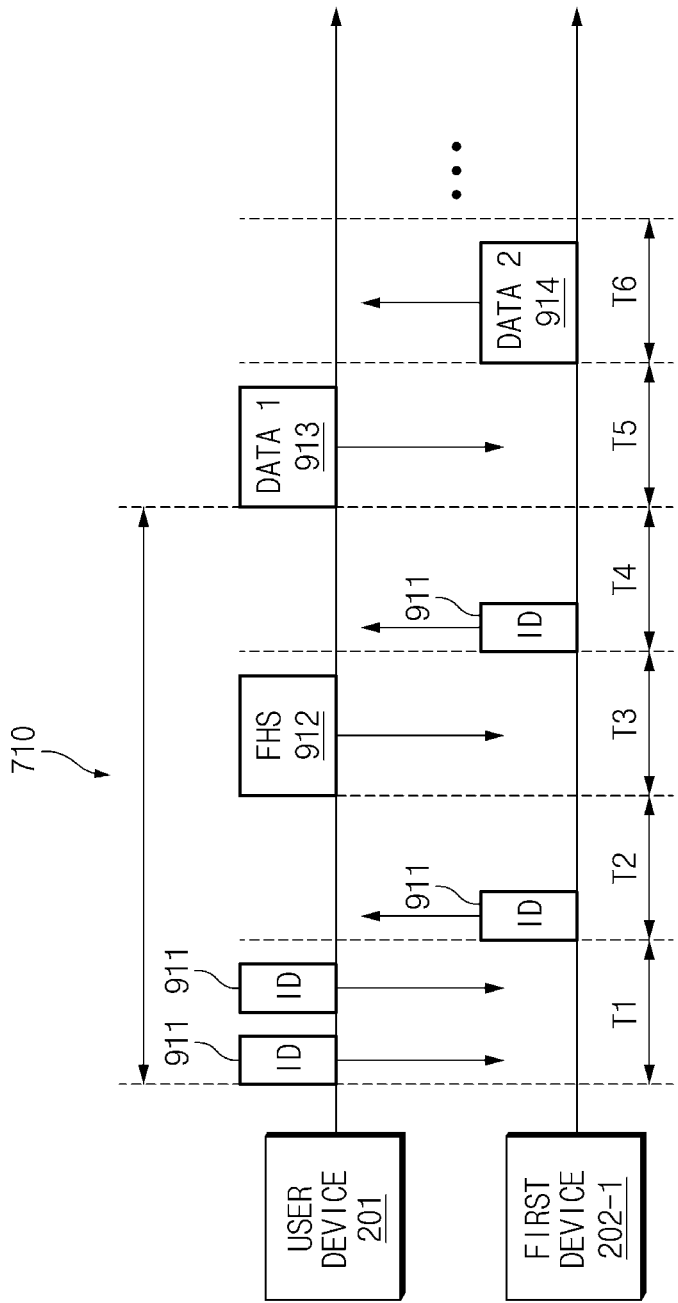
FIG. 9 is a diagram illustrating a packet exchange for performing paging according to an embodiment.

FIG. 9 is a diagram illustrating a packet exchange for performing paging according to an embodiment.

Referring to FIG. 9, in the example of FIG. 9, the user device 201 is a device that performs paging, and the first device 202-1 may be a device that performs a paging scan. However, embodiments of the present disclosure are not limited thereto. For example, the first device 202-1 may perform paging and the user device 201 may perform a paging scan. The user device 201 and the first device 202-1 may communicate based on a time interval (e.g., a time slot). For example, each time interval may correspond to a time slot (e.g., 625 μs) of a specified length. In the example of FIG. 9, odd time intervals T1, T3, and T5 may be time slots set to allow the user device 201 to transmit a signal to the first device 202-1, and even time intervals T2, T4, and T6 may be time slots set to allow the first device 202-1 to transmit a signal to the user device 201.

In the first time interval T1, the user device 201 may periodically transmit an ID packet 911. For example, the user device 201 may transmit the ID packet 911 including the access code of the first device 202-1. For example, the user device 201 may calculate the access code of the first device 202-1 using the BLUETOOTH address of the first device 202-1. For example, in the first time interval T1, the first device 202-1 may operate in a page scan mode. According to an embodiment, the first device 202-1 may perform a page scan at a specified period.

In the second time interval T2, in response to receiving the ID packet 911, the first device 202-1 may transmit, to the user device 201, the ID packet 911 that includes the access code of the first device 202-1. In the second time interval T2, the user device 201 may monitor whether or not the ID packet 911 is received from the first device 202-1.

In the third time interval T3, in response to receiving the ID packet 911, the user device 201 may transmit an FHS packet 912. For example, the FHS packet 912 may include the device name, the BLUETOOTH address, the device class, the service class, and/or the clock information of the user device 201.

In the fourth time interval T4, the first device 202-1 may transmit the ID packet 911 to the user device 201. The first device 202-1 may transmit the ID packet 911 in the fourth time interval T4 in response to receiving the FHS packet 912.

The first link 205 between the user device 201 and the first device 202-1 may be established according to a packet exchange in the first time interval T1 to the fourth time interval T4. For example, the user device 201 may transmit the first data 913 to the first device 202-1 in the fifth time interval T5. In the sixth time interval T6, the first device 202-1 may transmit the second data 914 to the user device 201. For example, the second data 914 may include a response message (e.g., ACK/NACK) to the first data 913.

Hereinafter, with reference to FIG. 10 and FIG. 11, a connection and communication method based on the BLE protocol will be described. Hereinafter, a connection and communication method based on the BLE protocol will be described based on the third link (e.g., the third link 215 of FIG. 2), but the following descriptions may be similarly applied to the first link 205 and/or the second link 210.

Figure 10:
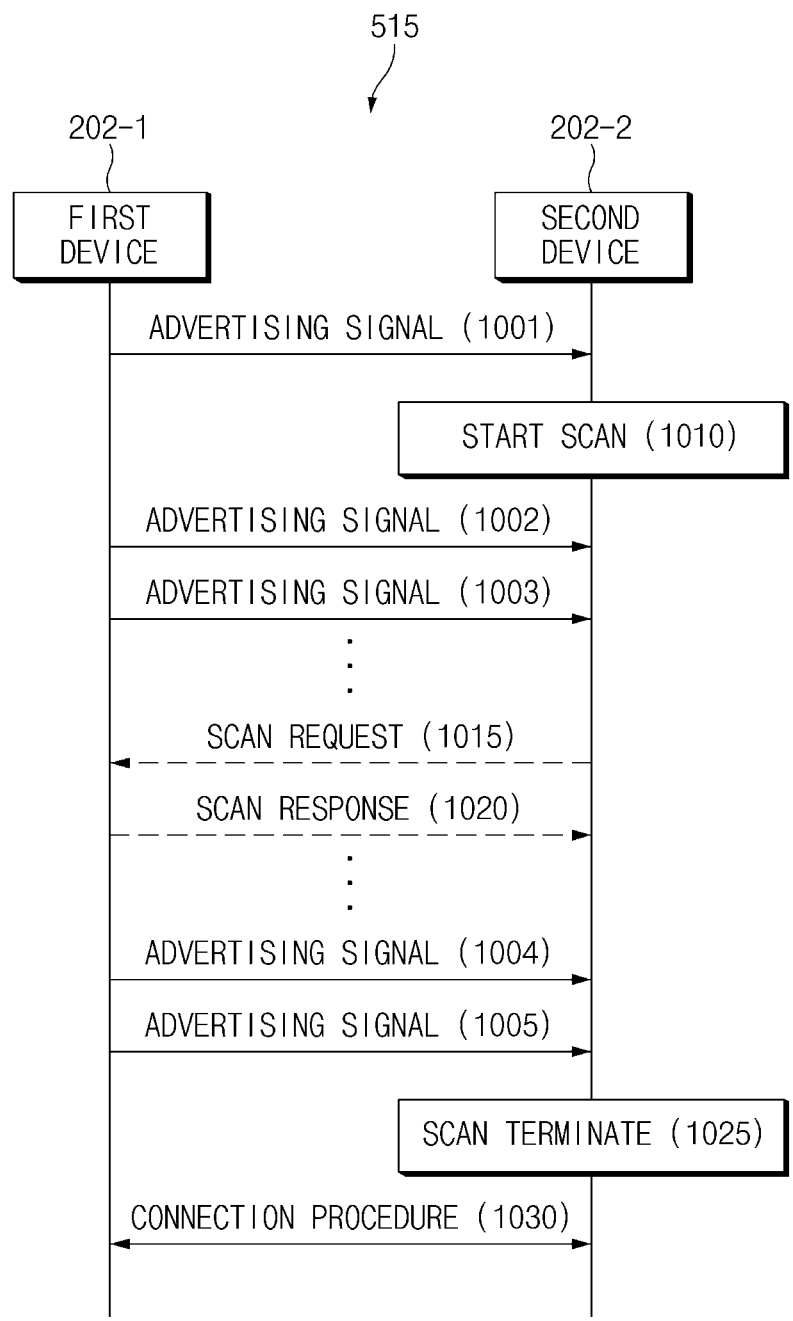
FIG. 10 is a signal flow diagram for connection of a third link according to an embodiment.

FIG. 10 is a signal flow diagram for connection of the third link 215 according to an embodiment. For example, operations of FIG. 10 may be included in the establishment operation (e.g., operation 515) of the third link 215 in FIG. 5. In FIG. 10, the first device 202-1 may periodically transmit an advertising signal including advertising data (e.g., operations 1001, 1002, 1003, 1004, and 1005). For example, the advertising signal may include at least one of identification information of the first device 202-1, user account information, device information currently paired with the first device 202-1 (e.g., a pairing list), information about devices capable of simultaneous pairing, transmission power, sensing area, and/or battery status information.

For example, in operation 1010, the second device 202-2 may start to scan, and in operation 1025, the second device 202-2 may terminate the scan.

According to an embodiment, in operation 1015, the second device 202-2 may transmit a scan request to the first device 202-1, and in operation 1020, the first device 202-1 may transmit a scan response to the second device 202-2. For example, in the case of an active scan, the first device 202-1 and the second device 202-2 may perform operations 1015 and 1020. For another example, in the case of a passive scan, operations 1015 and 1020 may be omitted.

In operation 1030, the first device 202-1 and the second device 202-2 may perform a connection procedure. For example, the second device 202-2 may transmit a connection request to the first device 202-1 and the first device 202-1 may transmit a response message to the second device 202-2, which makes the first device 202-1 and the second device 202-2 possible to be connected to each other.

Figure 11:
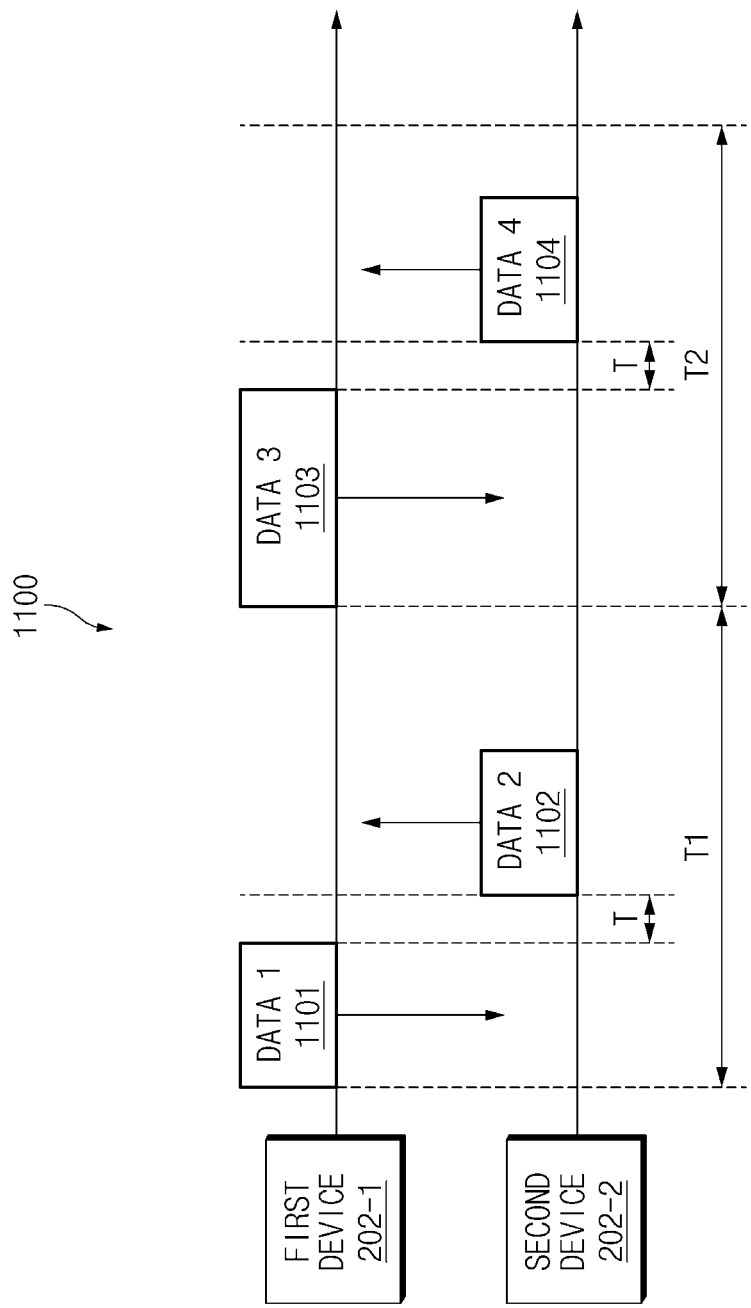
FIG. 11 is a diagram illustrating a packet exchange via the third link according to an embodiment.

FIG. 11 is a diagram illustrating a packet exchange 1100 via the third link 215 according to an embodiment. For example, the first device 202-1 and the second device 202-2 may be configured to transmit and receive signals in one connection interval.

In the first time interval T1, the first device 202-1 may transmit the first data 1101 to the second device 202-2. The second device 202-2 may transmit second data 1102 to the first device 202-1 after a specified time T (e.g., inter-frame space) after reception of the first data 1101. Similarly, in the second time interval T2, the first device 202-1 may transmit third data 1103 to the second device 202-2, and after the specified time T, the second device 202-2 may transmit fourth data 1104 to the first device 202-1.

Figure 12:
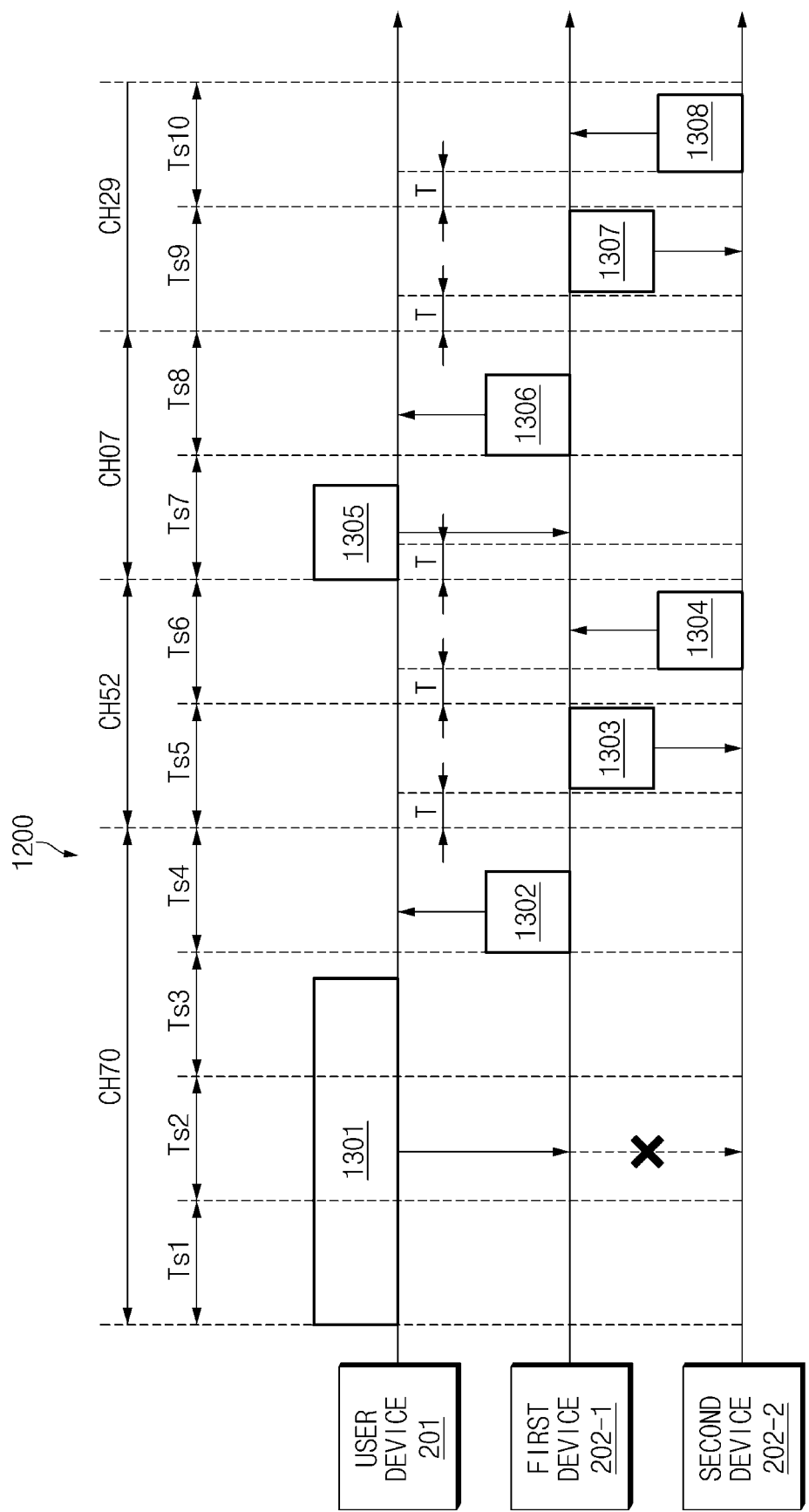
FIG. 12 is a diagram illustrating packet transmission and reception via multiple links according to an embodiment.

FIG. 12 is a diagram illustrating packet transmission and reception 1200 via multiple links according to an embodiment.

Referring to FIG. 12, the first device 202-1 and the second device 202-2 may operate by aligning the third link 215 according to the first link 205. For example, the third link 215 may be aligned with the time slots of the first link 205 at an offset T of a specified period.

In the first time slot Ts1, the second time slot Ts2, and a third time slot Ts3, the user device 201 may transmit first data 1301 via the first link 205. The first device 202-1 may receive the first data. In the first time slot Ts1, the second time slot Ts2, and the third time slot Ts3, the second device 202-2 may attempt to receive data from the user device 201 using the first link information.

In a fourth time slot Ts4 subsequent to the third time slot Ts3, the first device 202-1 may transmit a first response signal 1302 to the first data 1301. For example, the first response signal 1302 may indicate an ACK. The first device 202-1 may transmit the first response signal 1302 according to the time slot timing of the first link 205. In the example of FIG. 12, the second device 202-2 may attempt to receive data from the user device 201 using the first link information in the first time slot Ts1, the second time slot Ts2, and the third time slot Ts3, but may not receive it normally. The second device 202-2 may be configured not to transmit a response message to data (e.g., data received via the first link 205) from the user device 201. In the fourth time slot Ts4, the second device 202-2 may not transmit a response signal.

In the fifth time slot Ts5, the first device 202-1 may determine whether or not data from the user device 201 is received within a specified time T of the fifth time slot Ts5. If no data is received from the user device 201 within the specified time T, the first device 202-1 may communicate with the second device 202-2 via the third link 215 aligned with the fifth time slot Ts5 and the sixth time slot Ts6 of the first link 205. In the remaining time intervals of the fifth time slot Ts5 (e.g., the remaining time except the specified time T in the fifth time slot Ts5), the first device 202-1 may transmit second data 1303 via the third link 215. For example, the first device 202-1 may transmit the second data 1303 based on the slot timing of the third link 215 aligned with the first link 205 at the offset of the specified time T. For example, the first device 202-1 may transmit the second data 1303 via a channel 52 corresponding to the channel of the first link 205 according to the channel hopping of the first link 205. For example, the CAC of the second data 1303 may be set as the CAC of the first link 205. For example, the first device 202-1 may set the LT_ADDR of the second data 1303 to 0. The second data 1303 may include, for example, a message for inquiring whether the second device 202-2 has received the first data 1301.

In the fifth time slot Ts5, the second device 202-2 may determine whether or not data from the user device 201 is received within the specified time T of the fifth time slot Ts5. If no data is received from the user device 201 within the specified time T, the second device 202-2 may receive the second data 1303 from the first device 202-1 via the third link 215 based on the slot timing of the third link 215 aligned with the first link 205 at the offset of the specified time T. The second device 202-2 may receive the second data 1303 via a channel 52 corresponding to the channel of the first link 205 according to the channel hopping of the first link 205.

In the sixth time slot Ts6, the second device 202-2 may transmit a second response message 1304 to the first device 202-1 in the time slot of the third link 215 aligned with the time slot of the first link 205 at the offset of the specified time T. For example, the second response message 1304 may include data indicating that the second device 202-2 has not received the first data 1301. The second device 202-2 may transmit the second response message 1304 via the channel 52 corresponding to the channel of the first link 205.

In the specified time T of a seventh time slot Ts7, the first device 202-1 may determine whether to receive data from the user device 201. The first device 202-1 may receive third data 1305 from the user device 201 via the first link 205. The third data 1305 may be, for example, a POLL packet for synchronizing the first link 205. In an eighth time slot Ts8, the first device 202-1 may transmit a third response message 1306 to the third data 1305. For another example, the third data 1305 may be data (e.g., acoustic data) subsequent to the first data 1301. In this case, the first device 202-1 may retransmit the third data 1305 to the second device 202-2 via the third link 215 after the retransmission of the first data 1301 to the second device 202-2 is completed or terminated. The first device 202-1 may buffer the third data 1305 received in the seventh time slot Ts7 in a memory for retransmission of the third data 1305.

In the specified time T of a ninth time slot Ts9, the first device 202-1 may determine whether to receive data from the user device 201. The first device 202-1 may communicate with the second device 202-2 if no data is received from the user device 201 in the specified time T. For example, the first device 202-1 may transmit fourth data 1307 to the second device 202-2. The first device 202-1 may transmit the fourth data 1307 to the second device 202-2 via the third link 215 based on the slot timing of the third link 215 aligned with the first link 205 at the offset of the specified time T. For example, the first device 202-1 may transmit the fourth data 1307 to the second device 202-2 via a channel 29 corresponding to the channel of the first link 205 according to the channel hopping of the first link 205. For example, the first device 202-1 may retransmit at least a portion of the first data 1301 in response to the second response message 1304 (e.g., NACK). For example, the fourth data 1307 may include at least a portion of the first data 1301.

In the slot of the third link 215 corresponding to a tenth time slot Ts10, the second electronic device 202-2 may transmit a fourth response message 1308 to the fourth data 1307. In this case, the second device 202-2 may transmit the fourth response message 1308 to the first device 202-1 via the channel 29 corresponding to the channel of the first link 205 according to the channel hopping of the first link 205. For example, the fourth response message 1308 may indicate an ACK for the fourth data 1307 in which the first device 202-1 has retransmitted at least a portion of the first data 1301 received from the user device 201.

In the example of FIG. 12, if no data is received from the user device 201 in the specified time T in the time slot of the first link 205, the second device 202-2 may communicate with the first device 202-1 using a time slot of the third link 215 corresponding to the corresponding time slot. If no data is not received from the user device 201 in the specified time T, the first device 202-1 and the second device 202-2 may set the communication circuit to enable communication via the third link 215 for communication via the third link 215.

Figure 13:
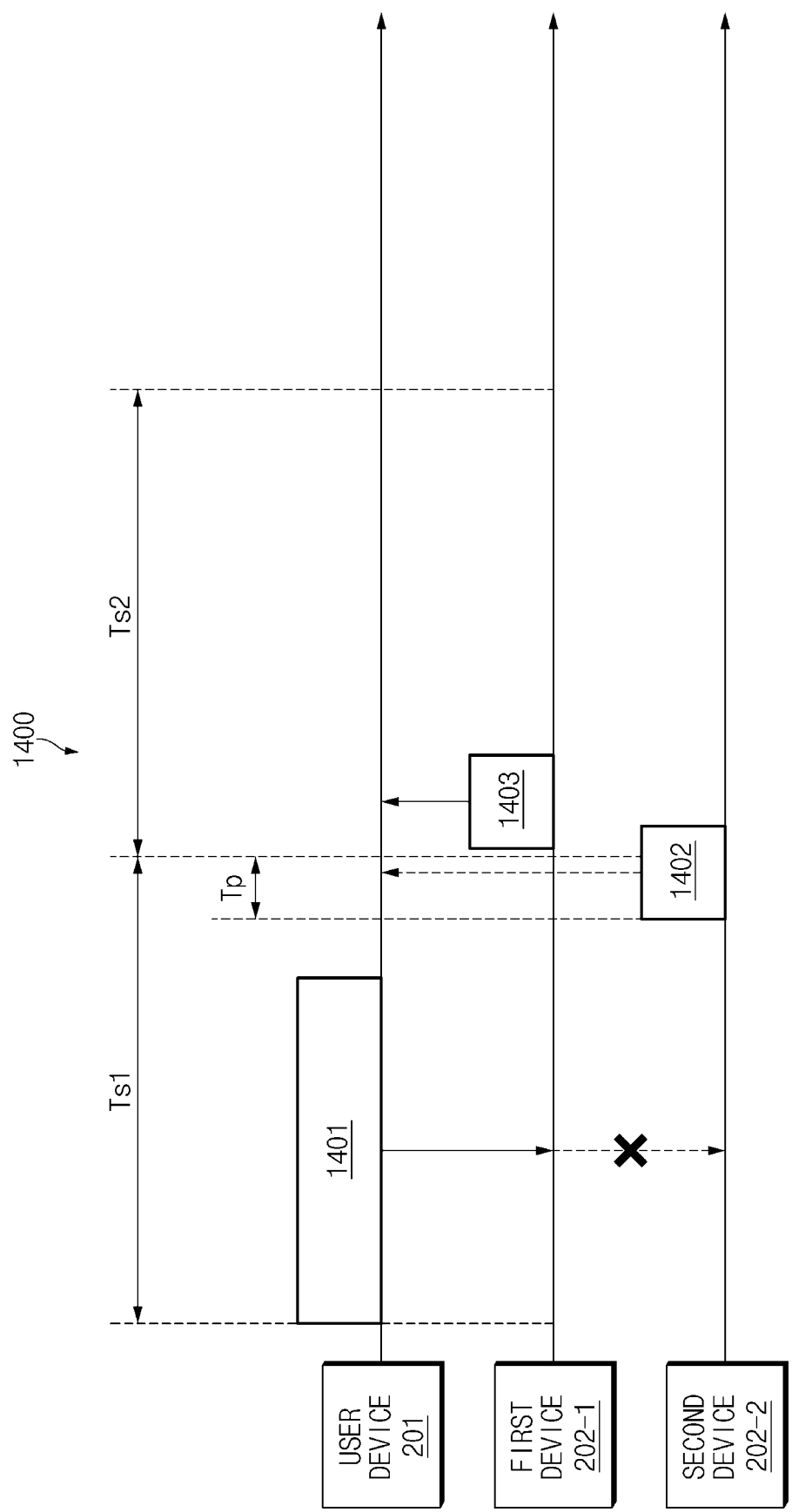
FIG. 13 is a diagram illustrating transmission of a response message according to an embodiment.

FIG. 13 is a diagram illustrating transmission 1400 of a response message according to an embodiment.

In the example of FIG. 12, the second device 202-2 may be configured not to transmit a response message to data from the user device 201. However, embodiments of the present disclosure are not limited thereto. According to an embodiment, the second device 202-2 may be configured to transmit a response message indicating a NACK if the reception of data via the first link 205 fails. For example, the second device 202-2 may be configured such that the second device 202-2 does not transmit the response message (e.g., ACK) if the reception of data via the first link 205 is successful, and transmits the response message (e.g., NACK) if the reception of data via the first link 205 fails or data decoding fails.

According to an embodiment, the second device 202-2 may be configured to transmit a response message ahead of the first device 202-1. Referring to FIG. 13, in the first time slot Ts1, the user device 201 may transmit first data 1401 via the first link 205. For example, the first device 202-1 may receive the first data 1401, but the second device 202-2 may fail to receive the first data 1401. FIG. 13 illustrates the second device 202-2 as failing to receive the first data 1401, but embodiments of the present disclosure are not limited thereto. For example, the second device 202-2 may receive the first data 1401, but may fail to decode the first data 1401. If the second device 202-2 fails to receive or decode the first data 1401, the second device 202-2 may transmit a first response message 1402 indicating a NACK to the user device 201 via the first link 205. The second device 202-2 may transmit the first response message 1402 by a specified time Tp before the start of the second time slot Ts2 such that the first response message 1402 is recognized by the user device 201. As illustrated in FIG. 13, the first device 202-1 may transmit a second response message 1403 via the first link 205 in the second time slot Ts2. For example, the second response message 1403 may indicate an ACK.

The user device 201 may attempt to receive a signal via the first link 205 in the second time slot Ts2 according to a time margin. For example, the user device 201 may attempt to receive a signal based on a time margin (e.g., about 10 µs), before the start of the second time slot Ts2. If both the first response message 1402 and the radio signal corresponding to the second response message 1403 are transmitted to the user device 201, the user device 201 may recognize that the transmission of the first data 1401 has failed, according to the first response message 1402 received first. Accordingly, in a time slot subsequent to the second time slot Ts2, the user device 201 may attempt to retransmit the first data 1401 via the first link 205.

According to an embodiment, the second device 202-2 may transmit the first response message 1402 such that the user device 201 does not receive it. For example, the second device 202-2 may transmit the first response message 1402 at a low power where reception by the first device 202-1 is possible and reception by the user device 201 is not possible. The user device 201 may determine that the transmission of the first data 1401 is successful based on the second response message 1403 of the first device 202-1. As described above with reference to FIG. 12, the first device 202-1 may perform retransmission of the first data 1401 to the second device 202-2 via the third link 215.

According to an embodiment, the second device 202-2 may not transmit the first response message 1402. In this case, the user device 201 may determine that the transmission of the first data 1401 is successful based on the second response message 1403 of the first device 202-1. As described above with reference to FIG. 12, the first device 202-1 may perform retransmission of the first data 1401 via the third link 215. The first device 202-1 may transmit, to the second device 202-2, a signal inquiring whether the first data 1401 is received via the third link 215, and may determine whether to retransmit the first data 1401 via the third link 215 based on the response signal from the second device 202-2.

Figure 14:
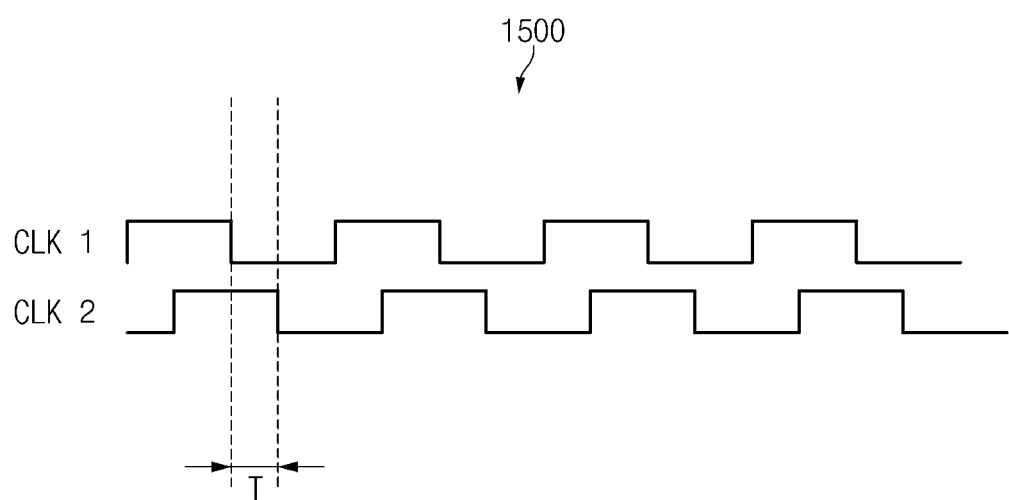
FIG. 14 is a diagram illustrating clock alignment according to an embodiment.

FIG. 14 is a diagram illustrating clock alignment 1500 according to an embodiment.

In FIG. 14, a first clock CLK1 represents the clock of the first link 205 and a second clock CLK2 represents the clock of the third link 215. For example, the first clock CLK1 and the second clock CLK2 may be aligned according to a specified offset T.

For example, the first device 202-1 may align the first clock CLK1 and the second clock CLK2 by transmitting a clock adjustment message to the second device 202-2. For another example, the first device 202-1 may transmit information of the first clock CLK1, and the second device 202-2 may align the second clock CLK2 based on the received information of the first clock CLK1.

As described above, since the first clock CLK1 and the second clock CLK2 are aligned, the first device 202-1 and the second device 202-2 may operate the first link 205 and the third link 215 by synchronizing timings of the time slots of the first link 205 and the third link 215.

Figure 15:
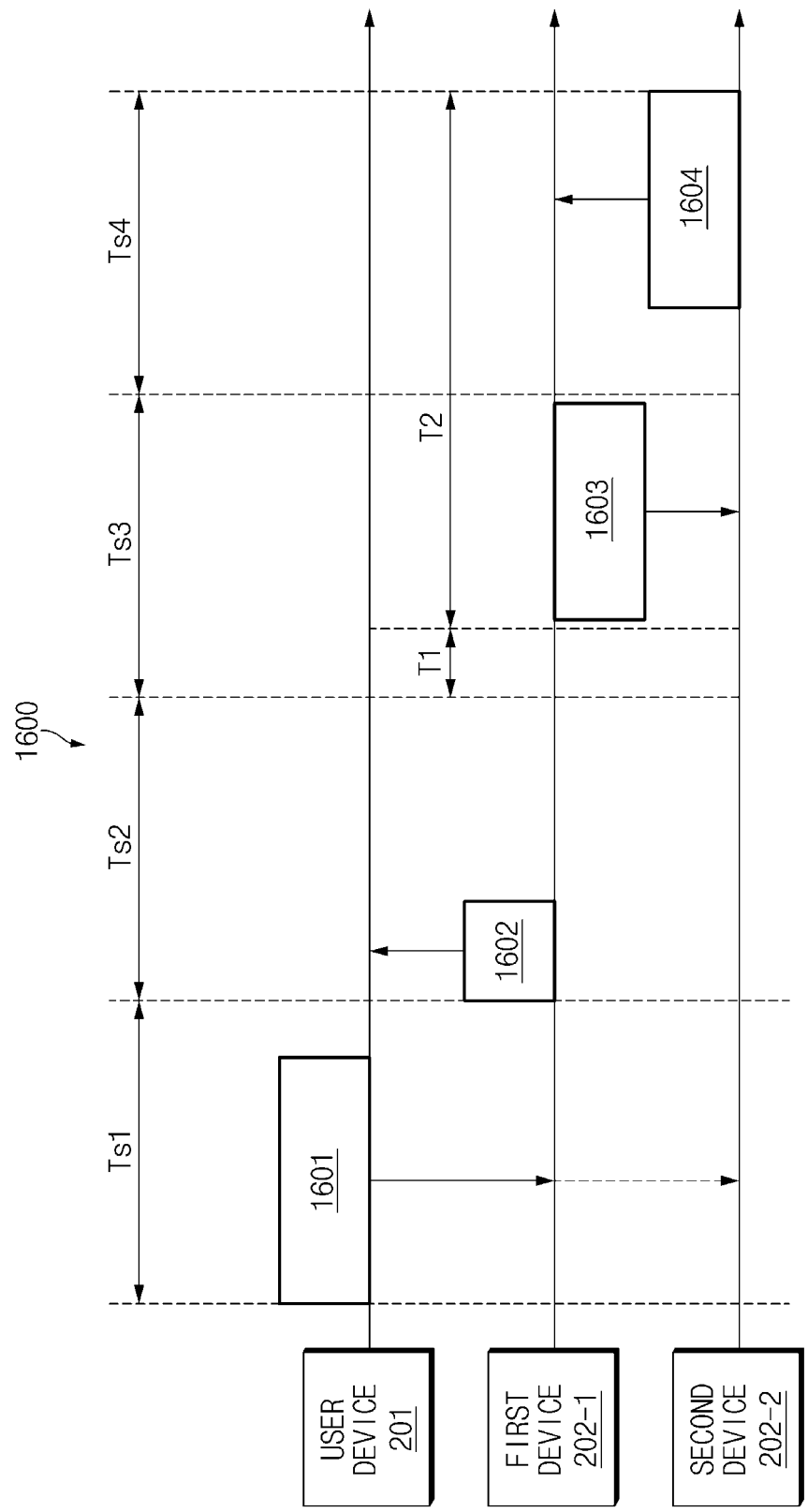
FIG. 15 is a diagram illustrating packet transmission and reception according to an embodiment.

FIG. 15 is a diagram illustrating packet transmission and reception 1600 according to an embodiment.

Figure 16:
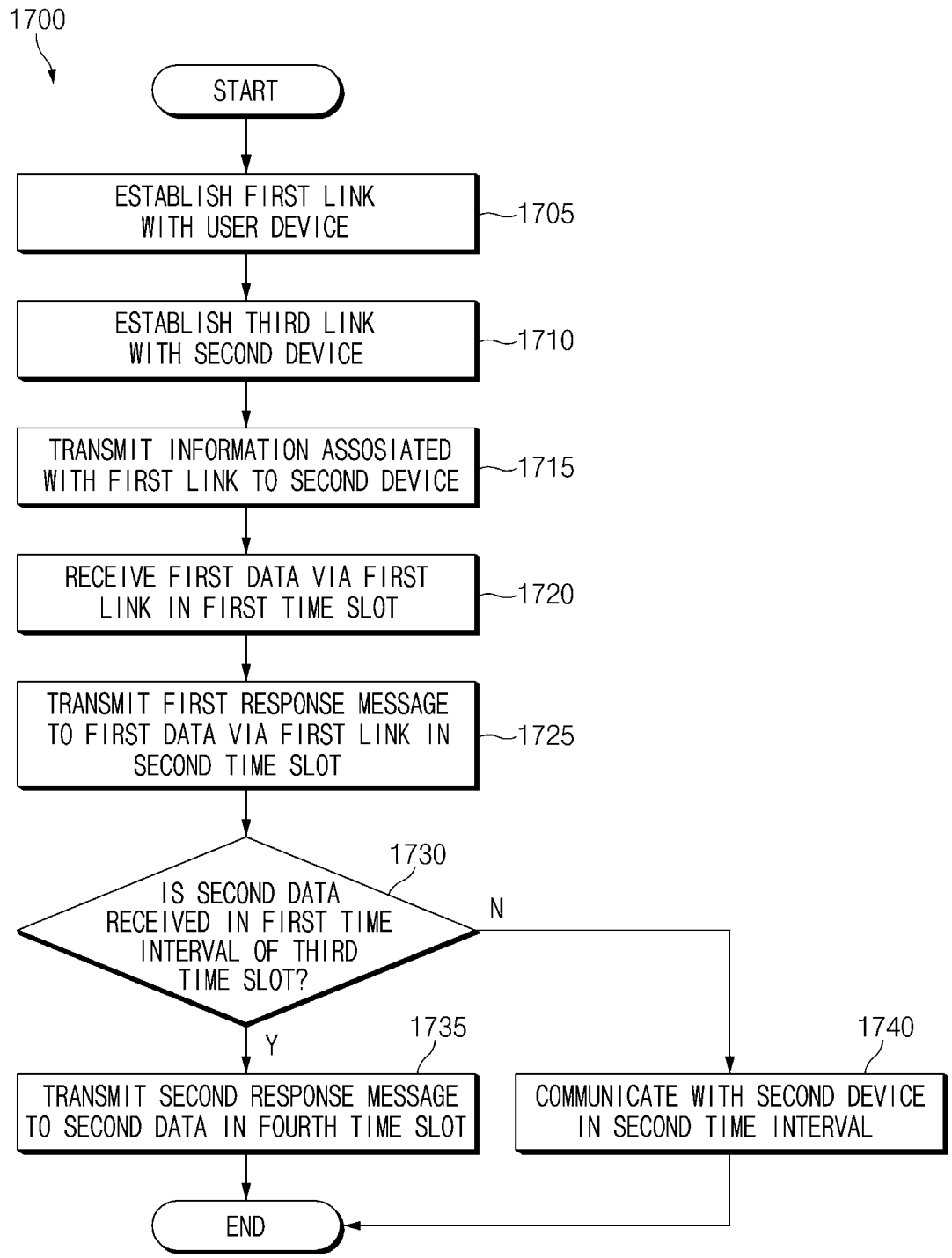
FIG. 16 is a flowchart of a communication method of a first device according to an embodiment.

FIG. 16 is a flowchart 1700 of a communication method of the first device according to an embodiment.

Referring to FIG. 15 and FIG. 16, in operation 1705, the first device 202-1 may establish the first link 205 with the user device 201. For example, the user device 201 may create (or establish) the first link 205 based on user input. For example, the user device 201 may create the first link 205 based on the BLUETOOTH legacy. In operation 1705, the first device 202-1 may be connected with the user device 201 via the first link 205. For example, the first link 205 may be one that is already established.

In operation 1710, the first device 202-1 may create (or establish) the third link 215 with the second device 202-2. For example, the first device 202-1 may create the third link 215 with the second device 202-2 based on the BLUETOOTH legacy or BLE. In operation 1710, the first device 202-1 may be connected with the second device 202-2 via the third link 215. For example, the third link 215 may be one that is already established.

In operation 1715, the first device 202-1 may transmit the information associated with the first link to the second device 202-2. The information associated with the first link may include information for estimation of a radio resource of the first link 205. For example, the information associated with the first link may include address information (e.g., the BLUETOOTH address of the master device of the first link 205, the BLUETOOTH address of the user device 201, and/or the BLUETOOTH address of the first device 202-1), piconet clock information (e.g. clock native (CLKN) of the master device of the first link 205), logical transport (LT) address information (e.g., information allocated by the master device of the first link 205), used channel map information, link key information, service discovery protocol (SDP) information (e.g., service and/or profile information associated with the first link 205), and/or supported feature information. For example, the first device 202-1 and the second device 202-2 may change operation information of the third link 215 using the information associated with the first link. The first device 202-1 and the second device 202-2 may change the operation information of the third link 215 at the same time or at different times. For example, the first device 202-1 may transmit information on a time point for changing the operation information of the third link 215 to the second device 202-2. The second device 202-2 may change the operation information of the third link 215 using the information associated with the first link at the time point for changing the indicated operation information of the third link 215. For another example, the first device 202-1 and the second device 202-2 may change the operation information of the third link 215 at any time point after sharing the information associated with the first link.

In operation 1720, the first device 202-1 may receive first data 1601 from the user device 201 via the first link 205 in the first time slot Ts1.

In operation 1725, the first device 202-1 may transmit a first response message to the first data via the first link 205 in the second time slot Ts2. For example, the first device 202-1 may transmit a first response message 1602 indicating an acknowledgement (e.g., ACK) of the first data 1601.

In operation 1730, the first device 202-1 may determine whether or not second data (not illustrated) is received from the user device 201 at the first time interval T1 of the third time slot Ts3. For example, the length of the first time interval T1 may be set according to a time margin (e.g., about 10 μs).

In operation 1735, if the second data is received (operation 1730—Y), the first device 202-1 may transmit a second response message to the second data to the first device 201 in the fourth time slot.

In operation 1740, if the second data is not received (operation 1730—N), the first device 202-1 may communicate with the second device 202-2 in the second time interval T2. For example, the second time interval T2 may include remaining time intervals except the first time interval T1 in the third time slot Ts3 and the fourth time slot Ts4. The first device 202-1 may communicate with the second device 202-2 via the third link 215 that is modified according to the operating elements of the first link 205.

In the second time interval of the third time slot Ts3, the first device 202-1 may use the resource information of the first link 205 to transmit the second data 1603 to the second device 202-2 via the third link 215 of which the timing is aligned with that of the first link 205. In the fourth time slot Ts4 of the second time interval T2, the second device 202-2 may use the resource information of the first link 205 to transmit the second response message 1604 to the first device 202-1 via the third link 215. According to an embodiment, the second data 1603 may include at least part of data (e.g., the first data 1601) received by the first device 202-1 via the first link 205 prior to the second data 1603. The first device 202-1 may transmit the second data 1603 to the second device 202-2 as a retransmission of data received from the user device 201. In this case, the second response message 1604 may include information indicating whether to receive the second data 1603 (e.g., retransmitted data). According to an embodiment, the second data 1603 may be a message issued by the first device 202-1, which inquires of the second device 202-2 about whether the second device 202-2 has received the first data 1601. In this case, the second response message 1604 may include information indicating whether or not the first data 1601 of the second device 202-2 has been received. For example, the second device 202-2 may request the first device 202-1 to retransmit the first data 1601 via the second response message 1604.

Figure 17:
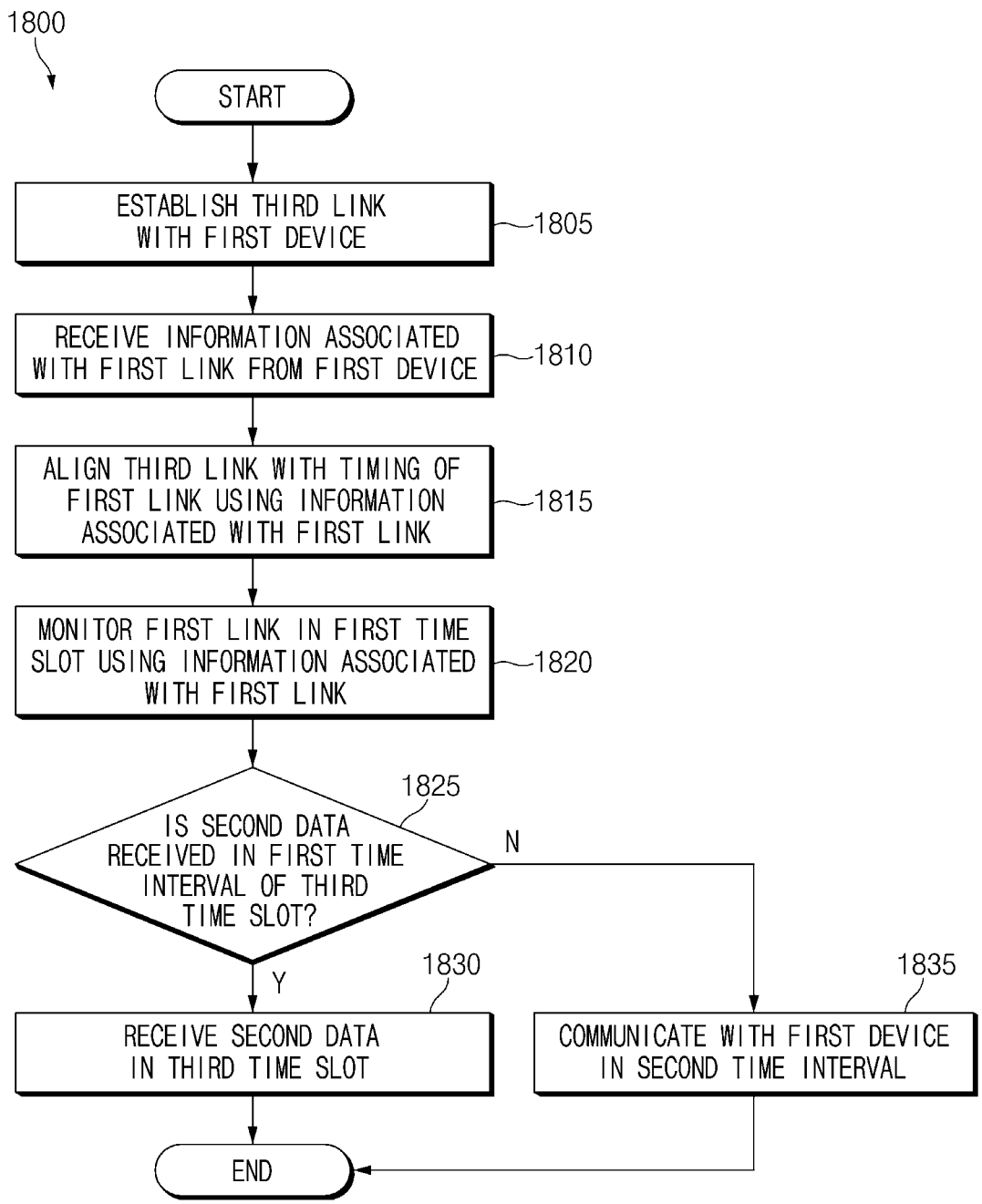
FIG. 17 is a flowchart of a communication method of a second device according to an embodiment.

FIG. 17 is a flowchart 1800 of a communication method of the second device according to an embodiment.

Referring to FIG. 15 and FIG. 17, in operation 1805, the second device 202-2 may create or establish the third link 215 with the first device 202-1. In operation 1810, the second device 202-2 may receive the information associated with the first link from the first device 202-1 via the third link 215. The information associated with the first link may include information for estimation of a radio resource of the first link 205. For example, the information associated with the first link may include address information (e.g., the BLUETOOTH address of the master device of the first link 205, the BLUETOOTH address of the user device 201, and/or the BLUETOOTH address of the first device 202-1), piconet clock information (e.g. clock native (CLKN) of the master device of the first link 205), logical transport (LT) address information (e.g., information allocated by the master device of the first link 205), used channel map information, link key information, service discovery protocol (SDP) information (e.g., service and/or profile information associated with the first link 205), and/or supported feature information.

In operation 1815, the second device 202-2 may align the third link 215 with the timing of the first link 205 using the information associated with the first link. For example, the second device 202-2 may align the first link 205 with the third link 215 using clock information of the information associated with the first link.

In operation 1820, the second device 202-2 may monitor the first link 205 in the first time slot Ts1 using the information associated with the first link. For example, the second device 202-2 may receive the first data 1601 transmitted by the user device 201 by monitoring the first link 205 in the first time slot Ts1.

In operation 1825, the second device 202-2 may determine whether or not second data (not illustrated) is received from the user device 201 at the first time interval T1 of the third time slot Ts3. For example, the length of the first time interval T1 may be set according to a time margin (e.g., about 10 μs).

In operation 1830, if the second data is received at the first time interval T1 (operation 1825—Y), the second device 202-2 may receive the second data via the first link 205 in the third time slot Ts3.

In operation 1724, if the second data is not received (operation 1825—N), the second device 202-2 may communicate with the first device 202-1 in the second time interval T2. For example, the second time interval T2 may include remaining time intervals except the first time interval T1 in the third time slot Ts3 and the fourth time slot Ts4. The second device 202-2 may communicate with the second device 202-2 via the third link 215 that is modified according to the operating elements of the first link 205.

Referring to FIG. 4, according to various embodiments, an electronic device (e.g., the first device 202-1) may include a wireless communication circuit (e.g., the communication circuit 491) configured to support BLUETOOTH communication (e.g., communicating means), a processor (e.g., the processor 421) operatively connected with the wireless communication circuit (e.g., determination means), and a memory (the memory 431) operatively connected with the processor (e.g., storing means). The memory may store one or more instructions that, when executed, cause the processor to establish a first link (e.g., the first link 205) configured to communicate with a first external electronic device (e.g., the user device 201) in units of time slots using the wireless communication circuit, establish a second link (e.g., the third link 215) with a second external electronic device (e.g., the second device 202-2) using the wireless communication circuit, transmit first link information for estimation of a radio resource of the first link to the second external electronic device via the second link, receive first data from the first external electronic device via the first link in a first time slot of the first link, transmit a first response message to the first data to the first external electronic device via the first link in a second time slot of the first link subsequent to the first time slot, determine whether or not second data is received from the first external electronic device via the first link, within a first time interval set in a third time slot of the first link subsequent to the second time slot, and if the second data is not received within the first time interval, and communicate with the second external electronic device via the second link in a second time interval subsequent to the first time interval and including a portion of the third time slot.

According to an embodiment, the one or more instructions may, when executed, cause the processor to change the radio resource of the second link based on the first link information, and communicate with the second external electronic device via the second link based on timings aligned based on the time slots of the first link.

According to an embodiment, the second link may be aligned with the time slots of the first link so as to have an offset corresponding to the first time interval. The one or more instructions may, when executed, cause the processor to transmit a message to the second external electronic device via the second link within the second time interval of the third time slot, and receive a second response message to the message from the second external electronic device via the second link in a fourth time slot of the first link subsequent to the third time slot.

According to an embodiment, the third time slot may be a time slot set to allow the first external electronic device to transmit a signal to the electronic device, and the fourth time slot may be a time slot set to allow the electronic device to transmit a signal to the first external electronic device.

According to an embodiment, the message may be a message for inquiring about reception of the first data, and the second response message may indicate whether or not the first data is received by the second external electronic device. For example, the one or more instructions may, when executed, cause the processor to transmit at least a portion of the first data to the second external electronic device via the second link in the time slot of the second link aligned with a fifth time slot of the first link subsequent to the fourth time slot if the second response message indicates a negative acknowledgement of the first data. For example, the offset may be 10 µs.

According to an embodiment, the one or more instructions may, when executed, cause the processor to estimate channel hopping of the first link and communicate with the second external electronic device via the second link based on the estimated channel hopping.

According to an embodiment, the one or more instructions may, when executed, cause the processor to communicate with the second external electronic device via the second link using a channel access code of the first link in the second time interval if the second data is not received within the first time interval.

Referring to FIG. 4, according to various embodiments, an electronic device (e.g., the second device 202-2) may include a wireless communication circuit (e.g., the communication circuit 492) configured to support BLUETOOTH communication, a processor (e.g., the processor 422) operatively connected with the wireless communication circuit, and a memory (the memory 432) operatively connected with the processor. The memory may store one or more instructions that, when executed, cause the processor to establish a first link (e.g., the third link 215) with a first external electronic device (e.g., the first device 202-1) using the wireless communication circuit, receive second link information for estimation of a radio resource of a second link (e.g., the first link 205) between the first external electronic device and a second external electronic device (e.g., the user device 201) from the first external electronic device via the first link, receive first data transmitted from the second external electronic device via the second link in a first time slot of the second link using the second link information, determine whether or not second data is received from the second external electronic device via the second link, within a first time interval set in a third time slot of the second link, and if the second data is not received within the first time interval, and communicate with the first external electronic device via the first link using a channel access code of the second link in a second time interval subsequent to the first time interval and including a portion of the third time slot. The third time slot may be a time slot set to allow the second external electronic device to transmit a signal to the first external electronic device.

According to an embodiment, the one or more instructions may cause, when executed, the processor to change a radio resource of the first link based on the second link information and align transmission and reception timings of the first link based on time slots of the second link using the second link information.

According to an embodiment, the first link may be aligned with the time slots of the second link so as to have an offset corresponding to the first time interval. The one or more instructions may, when executed, cause the processor to receive a message from the first external electronic device via the first link within the second time interval of the third time slot, and transmit a response message to the message to the first external electronic device via the first link in a fourth time slot of the second link subsequent to the third time slot. For example, the fourth time slot may be a time slot set to allow the first external electronic device to transmit a signal to the first external electronic device. For example, the message may be a message for inquiring about reception of the first data, and the response message may indicate whether or not the first data is received by the electronic device. For example, logical transport addresses of the message and the response message may be set to 0.

According to an embodiment, the one or more instructions may, when executed, cause the processor to estimate channel hopping of the second link and communicate with the first external electronic device via the first link based on the estimated channel hopping.

Referring to FIG. 4, according to various embodiments, a communication method of an electronic device (e.g., the first device 202-1) may include establishing a first link configured to communicate with a first external electronic device (e.g., the user device 201) in units of time slots based on a BLUETOOTH communication standard, establishing a second link (e.g., the third link 215) with a second external electronic device (e.g., the second device 202-2) based on the BLUETOOTH communication standard, transmitting first link information for estimation of a radio resource of the first link to the second external electronic device via the second link, receiving first data from the first external electronic device via the first link in a first time slot of the first link, transmitting a first response message to the first data to the first external electronic device via the first link, in a second time slot of the first link subsequent to the first time slot, determining whether or not second data is received from the first external electronic device via the first link, within a first time interval set in a third time slot of the first link subsequent to the second time slot, and if the second data is not received within the first time interval, communicating with the second external electronic device via the second link in a second time interval subsequent to the first time interval and including a portion of the third time slot.

According to an embodiment, the communicating with the second external electronic device via the second link using the channel access code of the first link may include communicating with the second external electronic device via the second link based on timings aligned based on the time slots of the first link.

According to an embodiment, the communicating with the second external electronic device via the second link based on timings aligned based on the time slots of the first link may include transmitting a message to the second external electronic device via the second link within the second time interval of the third time slot, and receiving a second response message to the message from the second external electronic device via the second link in a fourth time slot of the first link subsequent to the third time slot. The second link may be aligned with the time slots of the first link so as to have an offset corresponding to the first time interval. For example, the third time slot may be a time slot set to allow the first external electronic device to transmit a signal to the electronic device, and the fourth time slot may be a time slot set to allow the electronic device to transmit a signal to the first external electronic device.

According to an embodiment, the communicating with the second external electronic device via the second link using the channel access code of the first link may include estimating channel hopping of the second link and communicating with the first external electronic device via the first link based on the estimated channel hopping.

According to an embodiment, the electronic device (e.g., the user device 201 of FIG. 4) may be connected with the first external electronic device via the first link configured to communicate in units of time slots, and may include a communication means for connecting with the second external electronic device via the second link. For example, the communication means may provide communication with a first external electronic device and a second external electronic device. The communication means may transmit first link information for estimation of a radio resource of the first link to the second external electronic device via the second link, and receive first data from the first external electronic device via the first link in a first time slot of the first link, and transmit a first response message to the first data to the first external electronic device via the first link in a second time slot of the first link subsequent to the first time slot. The electronic device may include a determination means for determining whether or not second data is received from the first external electronic device via the first link, in a first time interval set in a third time slot of the first link subsequent to the second time slot. The determining means may cause the communication means to, if the second data is not received within the first time interval, communicate with the second external electronic device via the second link in the second time interval subsequent to the first time interval and including a portion of the third time slot.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:
1. An electronic device comprising:
a wireless communication circuit configured to support Bluetooth communication;
a processor operatively connected with the wireless communication circuit; and
a memory operatively connected with the processor,
wherein the memory stores one or more instructions that, when executed, cause the processor to:
connect with a first external electronic device via a first link configured to communicate in units of time slots using the wireless communication circuit,
connect with a second external electronic device via a second link using the wireless communication circuit, transmit first link information for estimation of a radio resource of the first link to the second external electronic device via the second link, receive first data from the first external electronic device via the first link in a first time slot of the first link, transmit a first response message to the first data to the first external electronic device via the first link in a second time slot of the first link subsequent to the first time slot, determine whether or not second data is received from the first external electronic device via the first link, within a first time interval set in a third time slot of the first link subsequent to the second time slot, and if the second data is not received within the first time interval, communicate with the second external electronic device via the second link in a second time interval subsequent to the first time interval and including a portion of the third time slot.

2. The electronic device of claim 1, wherein the one or more instructions, when executed, cause the processor to change a radio resource of the second link based on the first link information and communicate with the second external electronic device via the second link based on timings aligned based on the time slots of the first link.

3. The electronic device of claim 2, wherein:

the second link is aligned with the time slots of the first link so as to have an offset corresponding to the first time interval, and the one or more instructions, when executed, cause the processor to:

transmit a message to the second external electronic device via the second link within the second time interval in the third time slot; and receive a second response message to the message from the second external electronic device via the second link in a fourth time slot of the first link subsequent to the third time slot.

4. The electronic device of claim 3, wherein:

the third time slot is a time slot set to allow the first external electronic device to transmit a signal to the electronic device, and the fourth time slot is a time slot set to allow the electronic device to transmit a signal to the first external electronic device.

5. The electronic device of claim 3, wherein:

the message is a message for inquiring about reception of the first data, and the second response message indicates whether or not the first data is received by the second external electronic device.

6. The electronic device of claim 5, wherein the one or more instructions, when executed, cause the processor to transmit at least a portion of the first data to the second external electronic device via the second link if the second response message indicates a negative acknowledgement of the first data.

7. The electronic device of claim 3, wherein the offset is 10 μs.

8. The electronic device of claim 2, wherein the one or more instructions, when executed, cause the processor to estimate channel hopping of the first link and communicate with the second external electronic device via the second link based on the estimated channel hopping, in order to change the radio resource of the second link based on the first link information.

9. The electronic device of any one of claims 2 to 4, wherein the one or more instructions, when executed, cause the processor to communicate with the second external electronic device via the second link using a channel access code of the first link in the second time interval if the second data is not received within the first time interval, in order to change the radio resource of the second link based on the first link information.

10. An electronic device comprising:

a wireless communication circuit configured to support Bluetooth communication;

a processor operatively connected with the wireless communication circuit; and a memory operatively connected with the processor, wherein the memory stores one or more instructions that, when executed, cause the processor to:

connect with a first external electronic device via a first link using the wireless communication circuit, receive second link information for estimation of a radio resource of a second link between the first external electronic device and a second external electronic device, from the first external electronic device via the first link, receive first data transmitted from the second external electronic device via the second link in a first time slot of the second link, using the second link information, determine whether or not second data is received from the second external electronic device via the second link, within a first time interval set in a third time slot of the second link, and if the second data is not received within the first time interval, communicate with the first external electronic device via the first link using a channel access code of the second link in a second time interval subsequent to the first time interval and including a portion of the third time slot, and wherein the third time slot is a time slot set to allow the second external electronic device to transmit a signal to the first external electronic device.

11. The electronic device of claim 10, wherein the one or more instructions, when executed, cause the processor to change a radio resource of the first link based on the second link information and align transmission and reception timings of the first link based on time slots of the second link using the second link information.

12. The electronic device of claim 11, wherein:

the first link is aligned with the time slots of the second link so as to have an offset corresponding to the first time interval, and the one or more instructions, when executed, cause the processor to:

receive a message from the first external electronic device via the first link within the second time interval of the third time slot, and transmit a response message to the message to the first external electronic device via the first link in a fourth time slot of the second link subsequent to the third time slot.

13. The electronic device of claim 12, wherein the fourth time slot is a time slot set to allow the first external electronic device to transmit a signal to the second external electronic device.

14. The electronic device of claim 12, wherein:

the message is a message for inquiring about reception of the first data, and the response message is a message indicating whether or not the first data is received by the electronic device.

15. The electronic device of claim 12, wherein logical transport addresses of the message and the response message are set to 0.

16. The electronic device of claim 10, wherein the one or more instructions, when executed, cause the processor to estimate channel hopping of the second link and communicate with the first external electronic device via the first link based on the estimated channel hopping.

17. A communication method of an electronic device, the communication method comprising:
connecting with a first external electronic device via a first link configured to communicate in units of time slots based on a Bluetooth communication standard;
connecting with a second external electronic device via a second link based on the Bluetooth communication standard;
transmitting first link information for estimation of a radio resource of the first link to the second external electronic device via the second link;
receiving first data from the first external electronic device via the first link in a first time slot of the first link;
transmitting a first response message to the first data to the first external electronic device via the first link, in a second time slot of the first link subsequent to the first time slot;
determining whether or not second data is received from the first external electronic device via the first link, within a first time interval set in a third time slot of the first link subsequent to the second time slot; and
if the second data is not received within the first time interval, communicating with the second external electronic device via the second link in a second time interval subsequent to the first time interval and including a portion of the third time slot.

18. The communication method of claim 17, wherein:
the communicating with the second external electronic device via the second link comprises changing the radio resource of the second link based on the first link information, and
the changing of the radio resource of the second link based on the first link information comprises communicating with the second external electronic device via the second link based on timings aligned based on the time slots of the first link.

19. The communication method of claim 18, wherein:
the communicating with the second external electronic device via the second link based on timings aligned based on the time slots of the first link comprises:
transmitting a message to the second external electronic device via the second link within the second time interval of the third time slot; and
receiving a second response message to the message from the second external electronic device via the second link in a fourth time slot of the first link subsequent to the third time slot, and
the second link is aligned with the time slots of the first link so as to have an offset corresponding to the first time interval.

20. The communication method of claim 19, wherein:
the third time slot is a time slot set to allow the first external electronic device to transmit a signal to the electronic device, and
the fourth time slot is a time slot set to allow the electronic device to transmit a signal to the first external electronic device.

* * * * *